United States Patent
Lee et al.

(10) Patent No.: US 12,380,322 B2
(45) Date of Patent: Aug. 5, 2025

(54) METHOD AND APPARATUS WITH NEURAL NETWORK OPERATION

(71) Applicant: SAMSUNG ELECTRONICS CO., LTD., Suwon-si (KR)

(72) Inventors: Dongwook Lee, Suwon-si (KR); Changyong Son, Anyang-si (KR); Jinwoo Son, Seoul (KR); Jaehyoung Yoo, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1074 days.

(21) Appl. No.: 17/245,144

(22) Filed: Apr. 30, 2021

(65) Prior Publication Data

US 2022/0092394 A1  Mar. 24, 2022

(30) Foreign Application Priority Data

Sep. 22, 2020  (KR) .................. 10-2020-0122313

(51) Int. Cl.
*G06N 3/063* (2023.01)
*G06F 9/50* (2006.01)
*G06N 3/0464* (2023.01)

(52) U.S. Cl.
CPC ........... *G06N 3/063* (2013.01); *G06F 9/5016* (2013.01); *G06N 3/0464* (2023.01)

(58) Field of Classification Search
CPC ..... G06N 3/063; G06N 3/0464; G06F 9/5016
See application file for complete search history.

(56) References Cited

U.S. PATENT DOCUMENTS

| 5,119,444 A | 6/1992 | Nishihara |
| 6,151,025 A | 11/2000 | Yen et al. |
| 6,580,836 B2 | 6/2003 | Politis |
| 9,582,726 B2 | 2/2017 | Pan et al. |

(Continued)

FOREIGN PATENT DOCUMENTS

| JP | H07-160875 A | 6/1995 |
| JP | 2019-220114 A | 12/2019 |
| KR | 10-2018-0107869 A | 10/2018 |

OTHER PUBLICATIONS

Nguyen, Duy Thanh, et al. "A high-throughput and power-efficient FPGA implementation of YOLO CNN for object detection." IEEE Transactions on Very Large Scale Integration (VLSI) Systems 27.8 (2019): 1861-1873 (Year: 2019).*

(Continued)

*Primary Examiner* — Shahid K Khan
(74) *Attorney, Agent, or Firm* — NSIP Law

(57) ABSTRACT

Provided is a method and apparatus with neural network operation. The method includes generating a first intermediate operation result by performing a first-order partial operation of a neural network layer on a first input line of a first area of a frame, generating a second intermediate operation result by performing another first-order partial operation of the neural network layer on a second input line of the first area, and generating an objective operation result of the neural network layer with respect to the first area based on a second-order partial operation performed on the first intermediate operation result and the second intermediate operation result.

30 Claims, 15 Drawing Sheets

(56) References Cited

U.S. PATENT DOCUMENTS

| | | | |
|---|---|---|---|
| 10,452,977 | B2 | 10/2019 | Son et al. |
| 10,489,703 | B2 | 11/2019 | Yang et al. |
| 10,768,856 | B1* | 9/2020 | Diamant ............... G06F 12/08 |
| 2021/0241408 | A1 | 8/2021 | Jung et al. |

OTHER PUBLICATIONS

Choi et al., CNNP-v2: An energy efficient memory-centric convolutional neural network processor architecture, 2019 IEEE International Conference on Artificial Intelligence Circuits and Systems (AICAS) (pp. 38-41) (Year: 2019).*

Bong et al., A low-power convolutional neural network face recognition processor and a CIS integrated with always-on face detector, IEEE Journal of Solid-State Circuits, 53(1), pp. 115-123 (Year: 2017).*

Wang, T., Geng, T., Li, A., Jin, X. and Herbordt, M., 2020. FPDeep: Scalable acceleration of CNN training on deeply-pipelined FPGA clusters. IEEE Transactions on Computers, 69(8), pp. 1143-1158 (Year: 2020).*

Zhang, C., Wu, D., Sun, J., Sun, G., Luo, G. and Cong, J., Aug. 2016. Energy-efficient CNN implementation on a deeply pipelined FPGA cluster. In Proceedings of the 2016 International Symposium on Low Power Electronics and Design (pp. 326-331) ( Year: 2016).*

Zhang, Chen, et al. "Energy-efficient CNN implementation on a deeply pipelined FPGA cluster." Proceedings of the 2016 International Symposium on Low Power Electronics and Design. 2016. (Year: 2016).*

Bong, Kyeongryeol, et al. "A low-power convolutional neural network face recognition processor and a CIS integrated with always-on face detector." IEEE Journal of Solid-State Circuits 53.1 (2017): 115-123. (Year: 2017)*

Wang, Tianqi, et al. "FPDeep: Scalable acceleration of CNN training on deeply-pipelined FPGA clusters." IEEE Transactions on Computers 69.8 (2020): 1143-1158. (Year: 2020)*

Choi, et al. "CNNP-v2: An energy efficient memory-centric convolutional neural network processor architecture." *2019 IEEE International Conference on Artificial Intelligence Circuits and Systems (AICAS)*. IEEE, Mar. 18, 2019. pp. 38-41.

Wang, et al. "Efficient hardware architectures for deep convolutional neural network." *IEEE Transactions on Circuits and Systems I: Regular Papers* vol. 65 No. 6 (Jun. 2018) : pp. 1941-1953.

Chen, et al. "Eyeriss: A spatial architecture for energy-efficient dataflow for convolutional neural networks." *ACM SIGARCH computer architecture news* vol. 44 Issue3 (Jun. 2016): pp. 367-379.

Extended European Search Report Issued Jan. 31, 2022 in counterpart European Patent Application No. 21187011.8 (9 pages in English).

Gural, Albert, and Boris Murmann. "Memory-Optimal Direct Convolutions for Maximizing Classification Accuracy in Embedded Applications." *ICML*. 2019. (10 pages in English).

\* cited by examiner

METHOD AND APPARATUS WITH NEURAL NETWORK OPERATION

CROSS-REFERENCE TO RELATED APPLICATIONS

This application claims the benefit under 35 USC § 119(a) of Korean Patent Application No. 10-2020-0122313, filed on Sep. 22, 2020, in the Korean Intellectual Property Office, the entire disclosure of which is incorporated herein by reference for all purposes.

BACKGROUND

1. Field

The following description relates to a method and apparatus with neural network operation.

2. Description of Related Art

Technical automation of a recognition process is implemented, for example, through a neural network model implemented by a processor in a special computational structure, which may provide a computationally intuitive mapping between an input pattern and an output pattern after considerable training. A capability trained to generate such a mapping may be called a learning capability of a neural network. Also, a neural network specialized and trained as above through a special training may have a generalization capability of generating a relatively accurate output to an untrained input pattern, noting that such discussions regarding neural networks are just examples.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a first intermediate operation result by performing a first-order partial operation of a neural network layer on a first input line of a first area of a frame, generating a second intermediate operation result by performing another first-order partial operation of the neural network layer on a second input line of the first area, and generating an objective operation result of the neural network layer with respect to the first area based on a second-order partial operation performed on the first intermediate operation result and the second intermediate operation result.

Each of the first-order partial operation on the first input line and the other first-order partial operation on the second input line may correspond to operations in a first direction of the first area, and the second-order partial operation performed on the first intermediate operation result and the second intermediate operation result may correspond to an operation in a second direction of the first area different from the first direction.

The first-order partial operation on the first input line may correspond to a one-dimensional (1D) convolution operation using weights, in the first direction, of a channel of a kernel of the neural network layer, and the other first-order partial operation on the second input line may correspond to another one-dimensional (1D) convolution operation using different weights, in the first direction, in the channel of the kernel.

Each of the first-order partial operation on the first input line and the other first-order partial operation on the second input line may correspond to one-dimensional (1D) convolution operations, and the second-order partial operation may correspond to an accumulation operation with respect to the first intermediate operation result and the second intermediate operation result.

Each of the first-order partial operation on the first input line and the other first-order partial operation on the second input line may correspond to 1D pooling operations in a first direction of the first area, and the second-order partial operation may correspond to a 1D pooling operation in a second direction different from the first direction.

The method may further include storing the generated first intermediate operation result in a first line buffer, where the generating of the objective operation result may include accumulating the stored first intermediate operation result and the generated second intermediate operation result and storing a result of the accumulating in the first line buffer.

After the objective operation result is generated, the first line buffer may be reused to store an intermediate operation result with respect to another area of the frame.

A total, corresponding to a total size of a dimension of an objective operation of the neural network layer, number of line buffers may be allocated to store respective intermediate operation results of the neural network layer.

The total size of the dimension of the objective operation may be a total size of a dimension of a two-dimensional (2D) weight kernel channel of the neural network layer.

The neural network layer may be a layer of a deep neural network that includes a skip connection, and the first input line is stored in a buffer associated with a catch layer of the skip connection and a storage state of the first input line may be maintained until an operation on the skip connection is completed.

Each of the generating of the first intermediate operation result and the generating of the second intermediate operation result may be performed before all of pixel values of the frame are received.

The method may further include completing, before all pixel values of the frame are received, respective objective operation results of plural subsequent neural network layers dependent on the generated objective operation result of the neural network layer with respect to the first area, where the neural network layer and the plural subsequent neural network layers may be layers of a same neural network.

The generating of the first intermediate operation result may be performed between a first point in time at which all of pixel values of the first input line of the frame are received and a second point in time at which at least a portion of other input lines of the frame are received.

The generating of the objective operation result may include generating a third intermediate operation result by performing the second-order partial operation on the first intermediate operation result and the second intermediate operation result, generating a fourth intermediate operation result by performing another second-order partial operation on other intermediate operation results generated through additional first-order partial operations on other input lines distinguished from the first input line and the second input line, and generating the objective operation result by performing a third-order partial operation on the third intermediate operation result and the fourth intermediate operation result.

The generated objective operation result may be a result of a three-dimensional convolution operation.

Each of the first-order partial operation on the first input line and the other first-order partial operation on the second input line may correspond to operations in a first direction of the first area, each of the second-order partial operation on the first intermediate operation result and the second intermediate operation result, and the other second-order partial operation on the other intermediate operation results may correspond to operations in a second direction of the first area different from the first direction, and the third-order partial operation on the third intermediate operation result and the fourth intermediate operation result may correspond to operations in a third direction of the first area, with the first area being a volume.

The method may further include capturing an image and storing image information for the captured image as the frame.

In one general aspect, one or more embodiments include a non-transitory computer-readable storage medium storing instructions that, when executed by a processor, cause the processor to perform one or more or all operations and methods described herein.

In one general aspect, a processing apparatus includes a processor, and a memory storing instructions, wherein execution of the instructions by the processor configures the processor to generate a first intermediate operation result by performing a first-order partial operation of a neural network layer on a first input line of a first area of a frame, generate a second intermediate operation result by performing another first-order partial operation of the neural network layer on a second input line of the first area, and generate an objective operation result of the neural network layer with respect to the first area based on a second-order partial operation performed on the first intermediate operation result and the second intermediate operation result.

Each of the first-order partial operation on the first input line and the other first-order partial operation on the second input line may correspond to operations in a first direction of the first area, and the second-order partial operation on the first intermediate operation result and the second intermediate operation result may corresponds to an operation in a second direction of the first area different from the first direction.

The processor may be configured to generate the first intermediate operation result by performing a one-dimensional (1D) pooling operation in a first direction on the first input line of the first area, and to generate the second intermediate operation result by performing another 1D pooling operation in the first direction on the second input line of the first area.

The processor may be configured to generate the objective operation result by performing a 1D pooling operation, in a second direction different from the first direction, on the first intermediate operation result and the second intermediate operation result.

The processor may be configured to generate each of the first intermediate operation result and the second intermediate operation result before all of pixel values of the frame are received.

The apparatus may further include a camera configured to capture an image and generate the frame as image values for the captured image.

The apparatus may be a sensor.

In one general aspect, an electronic device includes a camera configured to generate an image frame, and a processor configured to generate a first intermediate operation result by performing a first-order partial operation of a neural network layer on a first input line of a first area of a frame, generate a second intermediate operation result by performing another first-order partial operation of the neural network layer on a second input line of the first area, and generate an objective operation result of the neural network layer with respect to the first area based on a second-order partial operation performed on the first intermediate operation result and the second intermediate operation result.

The processor may be configured to generate the first intermediate operation result by performing a one dimensional (1D) convolution operation between the first input line of the first area and a first weight line of a weight kernel, and to generate the second intermediate operation result by performing a 1D convolution operation between the second input line of the first area and a second weight line of the weight kernel.

The processor may be configured to generate the objective operation result by performing an accumulation operation on the first intermediate operation result and the second intermediate operation result.

The processor may be configured to generate the first intermediate operation result by performing a 1D pooling operation in a first direction on the first input line of the first area, and to generate the second intermediate operation result by performing the 1D pooling operation in the first direction on the second input line of the first area.

The processor may be configured to generate the objective operation result by performing a 1D pooling operation, in a second direction different from the first direction, on the first intermediate operation result and the second intermediate operation result.

In one general aspect, a processing apparatus may include a processor configured to control an incremental receipt of image information of a frame in input line units, generate a plurality of output lines of a neural network layer of a neural network by, for each of the plurality of output lines of the neural network layer, accumulating results of one-dimensional (1D) convolution operations on each of respective plural line units of image information of the incrementally received image information of the frame, and generate a plurality of output lines of a subsequent neural network layer of the neural network by, for each of the plurality of output lines of the subsequent neural network layer, accumulating results of 1D convolution or pooling operations on each of respective multiple output lines of the plurality of output lines of the neural network layer, where generation of the plurality of output lines of the subsequent neural network layer are performed before all image information of the frame are incrementally received in the incremental receipt of the image information of the frame in the input line units.

The processor may be further configured to generate another output line of the neural network layer by accumulating results of one-dimensional (1D) convolution operations on each of another plural line units of additional image information of the incrementally received image information of the frame, where the generation of the other output line occurs after initiation of the generation of the plurality of output lines of the subsequent neural network layer.

Incremental receipt of the image information of the frame may include overwriting a line buffer, storing image information received in the incremental receipt of the image information of the frame, with other image information subsequently received in the incremental receipt of the image information of the frame, before all of the image information of the frame are incrementally received.

Other features and aspects will be apparent from the following detailed description, the drawings, and the claims.

Figure 1:
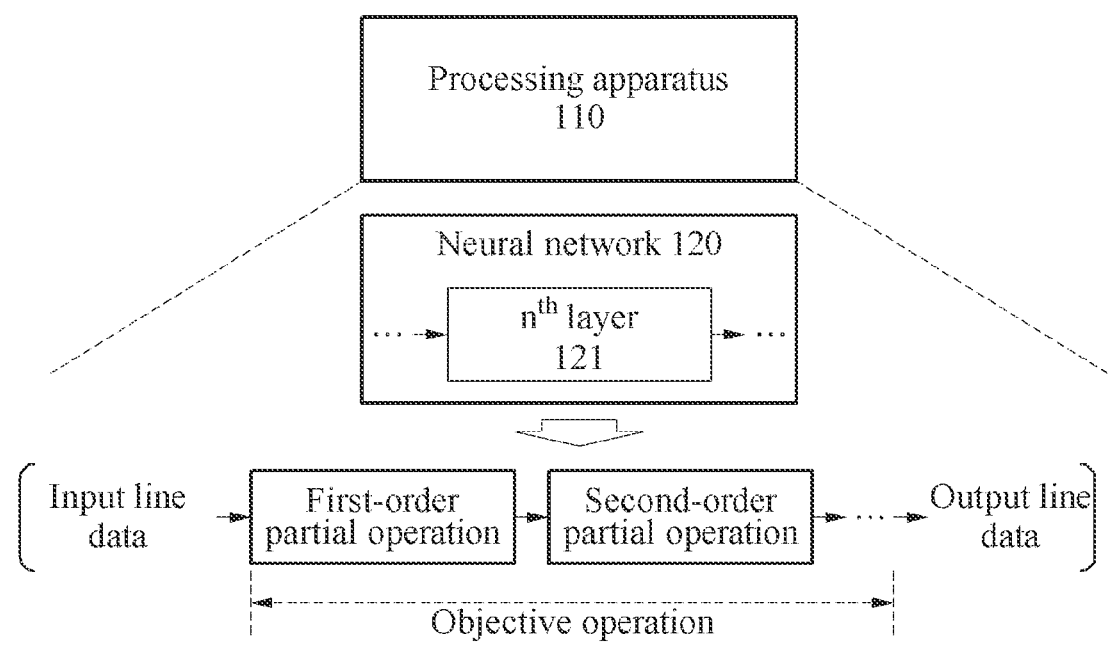
FIG. 1 illustrates an example of a processing apparatus configured to implement a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, some descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or groups thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong based on an understanding of the disclosure of this application. It will be further understood that terms, such as those defined in commonly-used dictionaries, should be interpreted as having a meaning that is consistent with their meaning in the context of the relevant art and the disclosure of this application and will not be interpreted in an idealized or overly formal sense unless expressly so defined herein.

FIG. 1 illustrates an example of a processing apparatus configured to implement a neural network. Referring to FIG. 1, an processing apparatus 110 processes an operation associated with a trained purpose of a neural network 120. In response to the processing apparatus 110 processing the associated operation, the neural network 120 may accomplish the trained purpose of the neural network. For example, the trained purpose of the neural network 120 may include an object classification, an object detection, an object tracking, an object identification, an object recognition, and/or a user authentication with corresponding input data, and as non-limiting examples.

The neural network 120 corresponds to a deep neural network (DNN) that includes a plurality of layers, for example. The plurality of layers may include an input layer, a hidden layer, and an output layer. An $n^{th}$ layer 121 corresponds to a portion of the plurality of layers. The neural network 120 may include a fully connected network (FCN), a convolutional neural network (CNN), and/or a recurrent neural network (RNN), as non-limiting examples. For example, a portion of the plurality of layers included in the neural network 120 may correspond to a CNN and another portion of the plurality of layers may correspond to an FCN.

For explanatory purposes only, the CNN may be referred to as a convolutional layer and the FCN may be referred to as a fully connected layer. For example, the processing apparatus 110 generates output data of the $n^{th}$ layer 121 by processing input data to the $n^{th}$ layer 121. For example, with the CNN example, input data may be referred to as an input feature map and the output data of the CNN may be referred to as an output feature map. The input feature map and the output feature map may also be respective activation data, e.g., with the input feature map being resultant activation data of a previous layer and the output data may be resultant activation data of a current layer. When the convolutional layer corresponds to the a first hidden layer after an input layer, an input feature map of the input layer may be, for example, an input image.

The neural network 120 results from being trained based on deep learning where inference operations are performed for a training purpose by mapping input data and output data having a nonlinear relationship therebetween. Deep learning refers to a machine learning scheme to solve a problem, such as image or voice recognition, using a bigdata set. Deep learning may be understood as an optimization problem solving process in which the neural network 120 is the result of incrementally training of a neural network to a point at which energy, loss, or costs are minimized based on prepared or labeled training data, for example. For example, after the in-training neural network learns a sufficiently large amount of training data through an appropriate training process, an optimized or optimal performance may be achieved.

Weights corresponding to a structure or a model of the neural network 120 may have been acquired through supervised and/or unsupervised learning of deep learning so input data and output data may be mapped based on the resultant trained weights. For example, with increased width and depth of example neural networks, the neural networks may have sufficient capacities to implement various arbitrary functions in various examples.

In the following, the neural network 120 is represented as being "pre"-trained. Here, "pre" represents before the neural network 120 "start" or is "implemented." That the neural network 120 "starts" represents that the neural network 120 is ready to perform inference operations. For example, that the neural network 120 starts or begins implementation may include that the neural network 120 is loaded to a memory or that input data for inference is input to the neural network 120 after the neural network 120 is loaded to the memory.

Although the example neural network 120 is discussed as being configured in layer units, in example implementations the neural network 120 does not necessarily need to process operations in such layer units. Rather, operations for each layer may be processed based on partial units of each layer. For example, the processing apparatus 110 may process output data of the $n^{th}$ layer 121 based on a line unit by processing input data of the $n^{th}$ layer 121 based on the line unit. Here, input data of a line unit may be referred to as input line data or an input line, and an output data of a line unit may be referred to as output line data or an output line.

Such input line data and output line data may each correspond to portions of respective multidimensional data. For example, input data of a layer may be multidimensional data, e.g., as two-dimensional image data. For example, in the case of multichannel image data having a width W, a height H, and two or more channels C, a portion thereof, that is, each W×H frame data may be multidimensional data. Input line data and output line data may each be one-dimensional (1D) (e.g., W×1×1) data that is a portion of a W×H frame data.

The neural network 120 performs an objective operation of processing input data of the $n^{th}$ layer 121. When the input data corresponds to multidimensional data, the objective operation may be a multidimensional operation and the objective operation may be configured to process the input data based on respective line units. To process the input data based on respective line units, the objective operation includes a plurality of partial operations corresponding to different dimensions. For example, when the objective operation is a multidimensional convolution operation or pooling operation, the objective operation may include a number of partial operations corresponding to a dimension of the convolution or pooling operation.

The objective operation may include elementwise operations, such as, for example, a skip connection operation, an activation function (e.g., rectifier linear unit (ReLU) or sigmoid) operation, and a normalization (e.g., a batch norm or an instance norm) operation. In the case of an elementwise operation, each element of input data may be independently processed, and thus, objective operations may be different between an operation that may be performed on a frame unit and operations that may be performed on line units, which are not available with previous multidimensional approaches.

For example, processing apparatus 110 divides or separates a multidimensional objective operation on the $n^{th}$ layer 121 into a plurality of partial operations and respectively processes the partial operations. Since the objective operation is divided into the partial operations, input multidimensional data may be processed based on partial units, for example, respective line data, and ultimately output multidimensional data may be generated, e.g. incrementally generated. For example, an x dimensional objective operation may include x partial operations and each partial operation may be referred as an x-order partial operation. Here, x denotes order in which each corresponding partial operation is performed. When the objective operation is a two-dimensional (2D) operation, a first-order partial operation on input line data may be performed and a second-order partial operation on an operation result of the first-order partial operation may be performed. Hereinafter, although the objective operation is described as a 2D operation for simplicity, it is provided as an example only. The objective operation may be an operation of other various dimensions, for example, a three dimension (3D) and a four dimension (4D). Description related to the 2D operation may apply to an operation of another dimension within the allowable range, for example.

When the objective operation is divided into the plurality of partial operations and processed, each partial operation may be specialized to process 1D line data and an ultimate result of the whole plurality of partial operations may be equivalent to a result of a frame based objective operation for a multidimensional input. For example, a final result of processing input data using the frame based objective operation may be identical to a final result of respective processing of the input line data using the plurality of partial operations. Partial operations may also be appropriately combined to implement a specific objective operation.

For example, the processing apparatus 110 processes a 2D objective operation on 2D input data based on units of 1D line data through 1D partial operations. For example, the 2D input data may be a 2D input frame and a 2D target area may be set to the 2D input frame. For example, the processing apparatus 110 may generate a first intermediate operation result by performing a first-order partial operation on first input line data of a target area included in the 2D input frame, generate a second intermediate operation result by performing a first-order partial operation on second input line data of the target area, and generate an objective operation result about the target area based on a second-order partial operation on the first intermediate operation result and the second intermediate operation result. When another line data in addition to the first input line data and the second input line data is included in the target area, a second-order partial operation may be further performed based on the other line data. When the target area includes K pieces of line data, intermediate operation results may be generated by performing a first-order partial operation on each piece of line data. An objective operation result about the target area may be generated through a second-order partial operation on the corresponding intermediate operation results.

When the input data is 3D input data, the processing apparatus 110 processes a 3D objective operation on the 3D input data based on a unit of 1D line data through 1D partial operations. A 3D target area may be set to the 3D input data. For example, the processing apparatus 110 may generate a first intermediate operation result by performing a first-order partial operation on first input line data of the target area, generate a second intermediate operation result by performing a first-order partial operation on second input line data of the target area, and generate a third intermediate operation result by performing a second-order partial operation on the first intermediate operation result and the second intermediate operation result. Also, the processing apparatus 110 may generate a fourth intermediate operation result by performing a second-order partial operation on other intermediate operation results that are generated through a first-order partial operation on other input lines distinguished from the first input line and the second input line and generate an objective operation result about the target area by performing a third-order partial operation on the third intermediate operation result and the fourth intermediate operation result.

Each partial operation may correspond to a different dimension. For example, when the objective operation is a 2D operation, the first-order partial operation may correspond to an operation in a first direction, for example, a width direction, and the second-order partial operation may correspond to an operation in a second direction, for example, a height direction. An operation on a single dimension may be processed through the first-order partial operation in the first direction and an operation on another dimension may be processed through the second-order partial operation in the second direction. Therefore, an objective operation of 2D may be implemented through a combination of partial operations of 1D. As another example, when the objective operation is a 3D operation, the third-order partial operation in a third direction may additionally be performed, e.g., a channel direction may be added in addition to the first-order partial operation and the second-order partial operation.

A partial operation of a multidimensional convolution operation may include a 1D convolution operation and an accumulation operation. For example, a 2D (e.g., 3×3) convolution operation may be performed through the 1D convolution operation as a first-order partial operation and the accumulation operation as a second-order partial operation. A partial operation of a multidimensional pooling operation may include a 1D pooling operation. For example, a 2D (e.g., 2×2) pooling operation may be performed through a 1D pooling operation in a first direction, for example, a width direction, as the first-order partial operation and through a 1D pooling operation in a second direction, for example, a height direction as the second-order partial operation.

In the case of the processing of multidimensional data based on a line unit, a memory is used at a level of performing each line processing instead of processing the entire multidimensional data, and this may lead to a decreased memory usage compared to the frame based processing of the entire multidimensional data. For example, in a typical processing of the entire frame, a memory to store an input feature map corresponding to the entire frame is required. Rather, when processing multidimensional data based on a line unit as described herein, for example, a memory to store a few lines for the respective line processing may be used to process the entire frame by dividing the frame into lines, and results of operations may also be considered by a subsequent layer based on a line unit instead of a frame unit, which also may reduce memory requirements. Once data for each line processing is collected, a network operation may immediately start. Therefore, compared to a typical frame-based method in which the network starts after data of the entire frame is collected, a latency may decrease when processing is based on a line unit. Also, such processing based on a line unit may also be employed in an environment with limited resources, such as, for example, a sensor with an on-sensor buffer memory and processing elements.

Figure 2:
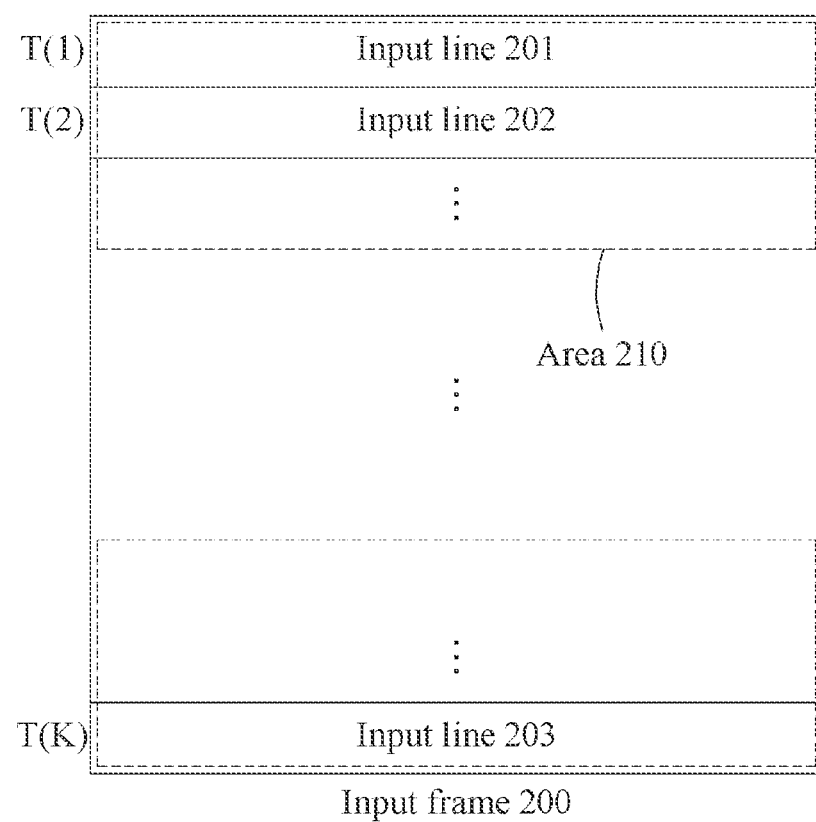
FIG. 2 illustrates an example of a relationship between an input frame and an input line.

FIG. 2 illustrates an example of a relationship between an input frame and an input line. Referring to FIG. 2, an input frame 200 includes a plurality of input lines 201, 202, . . . , 203 (201 to 203) and corresponds to an example of multidimensional data. In one example, an operation of a neural network is processed based on each input line of the input frame 200. For example, a partial operation on the input line 201 is performed in a time T(1), a partial operation on the input line 202 is performed in a time T(2), and a partial operation on the input line 203 is performed in a time T(K).

In one example, areas may be set based on an objective operation and each input line may belong to one of the areas. The input lines 201 and 202 belong to an area 210. A number of lines belonging to each area is determined based on the objective operation. When the objective operation is a 3×3 convolution operation, each area may include three lines, and when the objective operation is a 2×2 convolution operation, each area may include two lines. Similarly, when the objective operation is a 2×2 pooling operation, each area may include two lines.

In this case, an individual result of the objective operation may be generated for each area. When the objective operation is the 3×3 convolution operation, an objective operation result may be generated for each area including three lines. For example, the area 210 may include three input lines and an objective operation result about the area 210 may be generated in such a manner that a 1D convolution operation as a first-order partial operation and an accumulation operation as a second-order partial operation are performed based on the three input lines.

When the objective operation is the example 2×2 pooling operation, an objective operation result may be generated for each area including two lines. For example, the area 210 may include two input lines and an objective operation result about the area 210 may be generated in such a manner that a 1D pooling operation in a width direction as a first-order partial operation and a 1D pooling operation in a height direction as a second-order partial operation are performed based on the two input lines. The objective operation is repeated for each area and objective operation results about all of the areas of the input frame 200 are generated.

Figure 3:
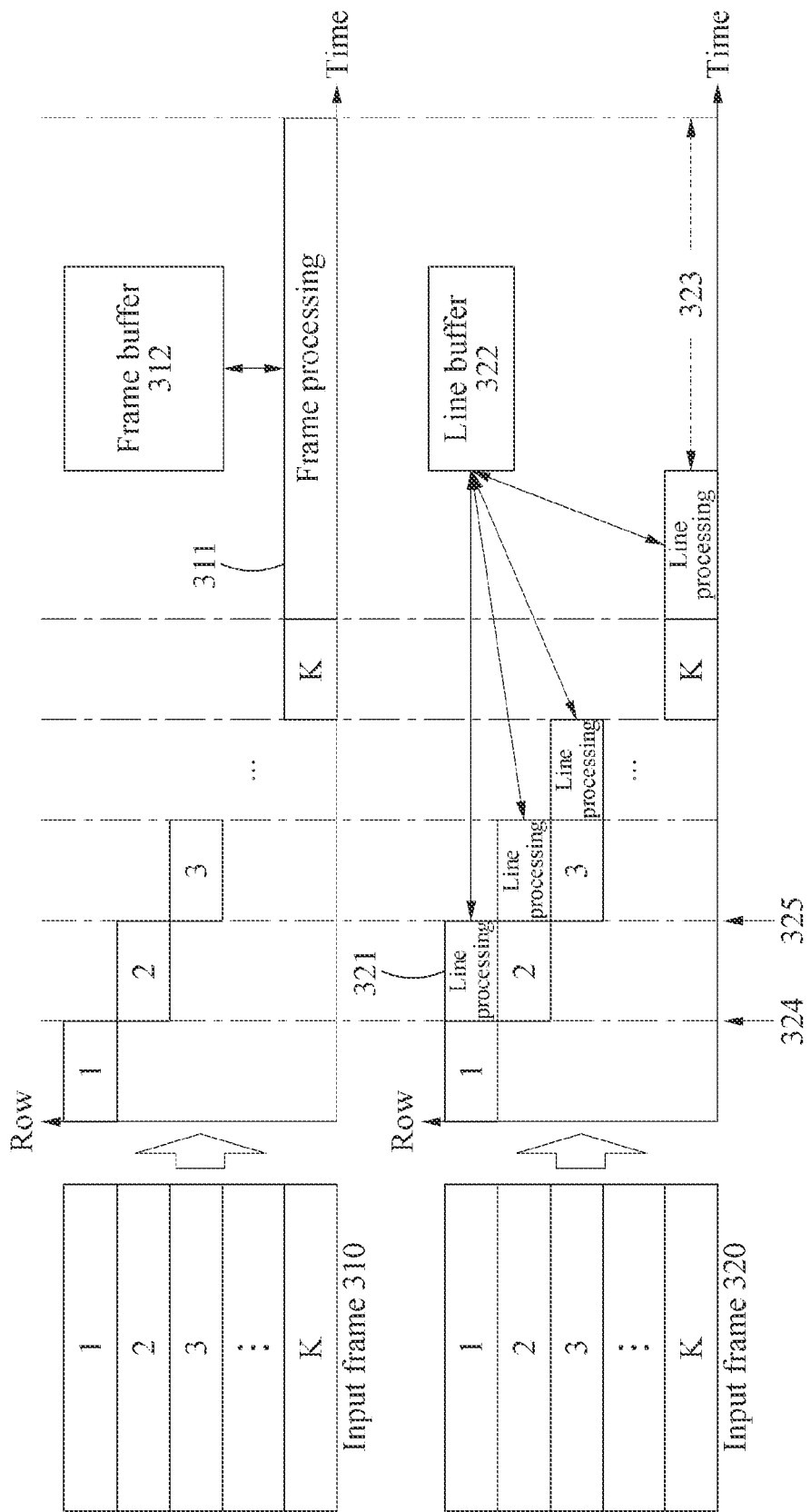
FIG. 3 illustrates an example of a comparison between a line processing and a frame processing.

FIG. 3 illustrates an example of a comparison between line processing and typical frame processing. Referring to FIG. 3, an input frame 310 may be processed based on a frame unit using a frame buffer 312. For example, when all of input lines 1 to K are stored in the frame buffer 312 through a read operation to complete the input frame 310, frame processing 311 is performed.

Dissimilar to the input frame 310, an input frame 320 may be processed based on a line unit using a line buffer 322. For example, when an input line is stored in the line buffer 322 through a read operation, line processing of the corresponding input line may be performed even before the input frame 320 is completed, and well before frame processing 311 is first performed. When an input line 1 of the input frame 320 is stored in the line buffer 322 through the read operation, line processing 321 of the input line 1 may be performed.

In one example, the line processing 321 may include performing a partial operation on the input line 1. A first intermediate operation result may be generated through a first-order partial operation on the input line 1 and a second intermediate operation result may be generated through a first-order partial operation on an input line 2. An objective operation result may be generated through a second-order partial operation on the first intermediate operation result and the second intermediate operation result. The above processing process is repeated with respect to each of the input lines 1 to K of the input frame 320.

Compared to the size of the frame buffer 312 corresponding to a size of the entire frame, a size of the line buffer 322 may correspond to a size of a plurality of lines, less than all lines of the entire frame, for example. In one example, a plurality of line buffers corresponding to a dimension of the objective operation may be provided to store the respective corresponding intermediate operation results. For example, K2 line buffers may be used for each of the K1×K2 convolution operations. Therefore, processing based on a line unit may decrease memory usage compared to the typical processing based on the frame unit. Also, as noted, the frame processing 311 may be performed after completion of an entire frame being read to the frame buffer 312, while the line processing 321 may be performed regardless of completion of the reading of the entire frame. Therefore, processing based on the line unit may decrease a latency of all processings to complete the objective operation for the entire frame, which leads to generate a latency improvement 323.

The first intermediate operation result and the second intermediate operation result of the example may be generated before all of the pixel values of the input frame 320 are received. For example, when reception of pixel values of the input line 1 is completed at a point in time 324, the first intermediate operation result may be generated between the point in time 324 and a point in time 325 at which reception of pixel values of a subsequent input line 2 is completed.

Figure 4:
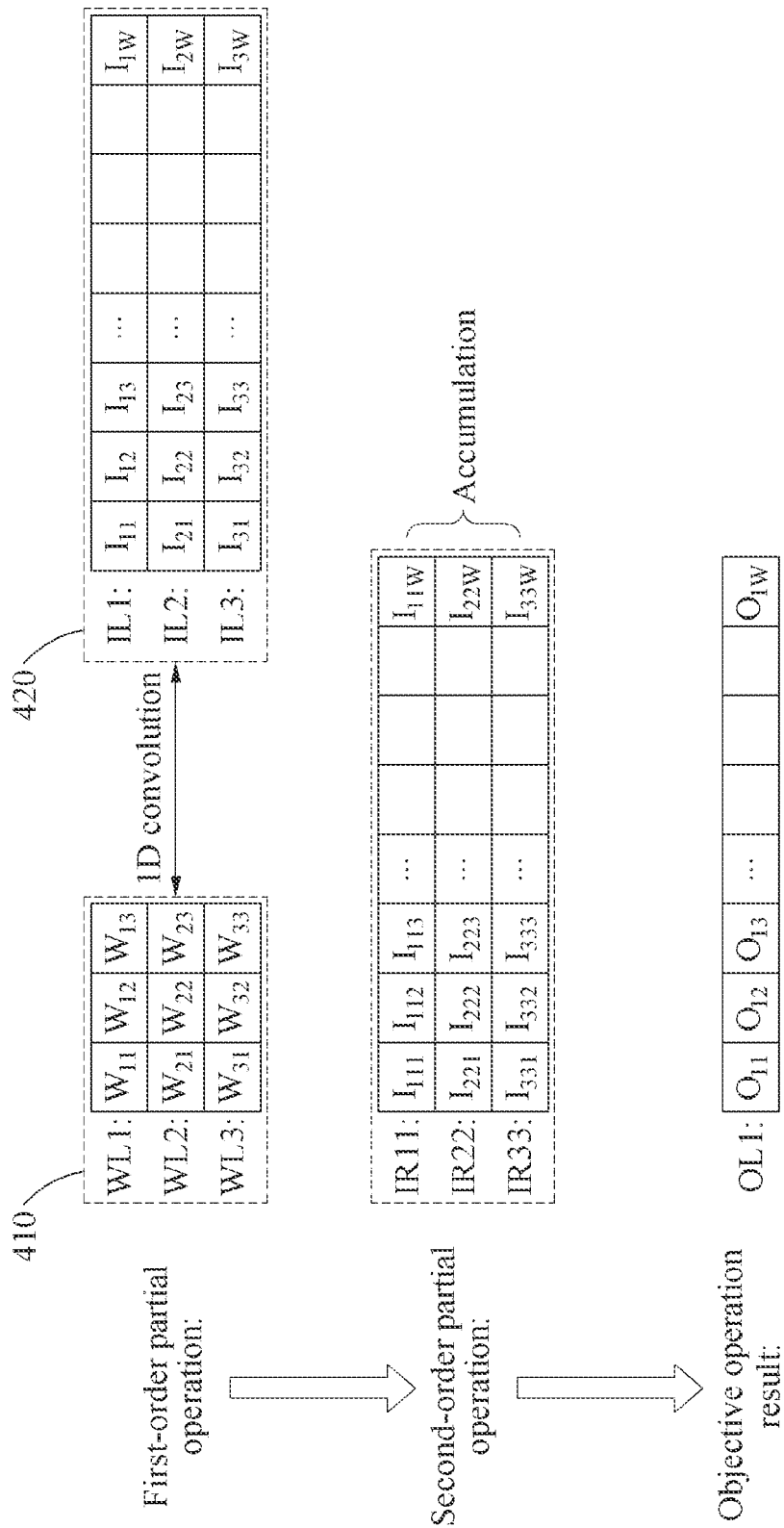
FIGS. 4 to 6 illustrate examples of processes of processing a two-dimensional (2D) convolution operation.
Figure 5:
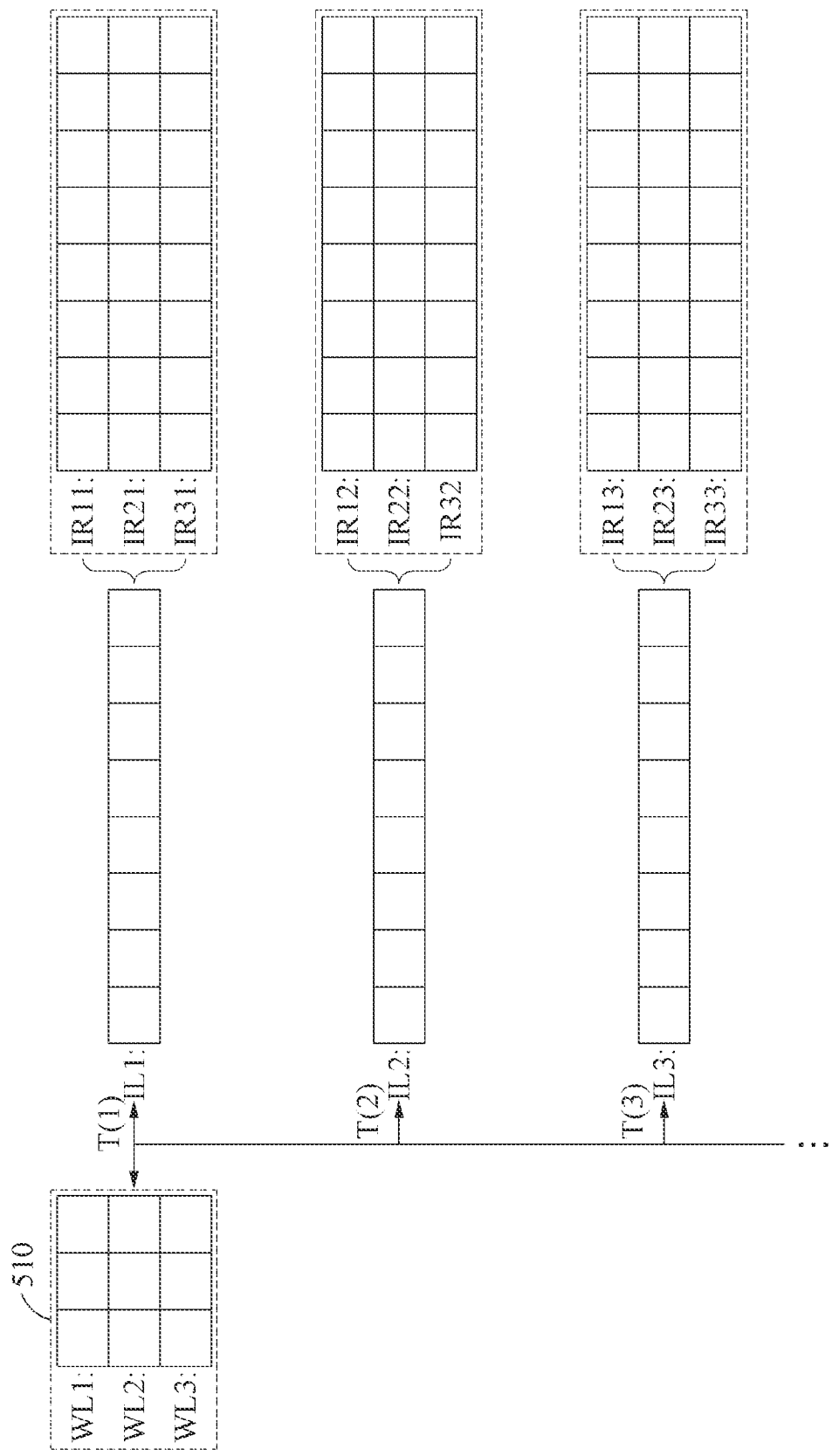
Figure 6:
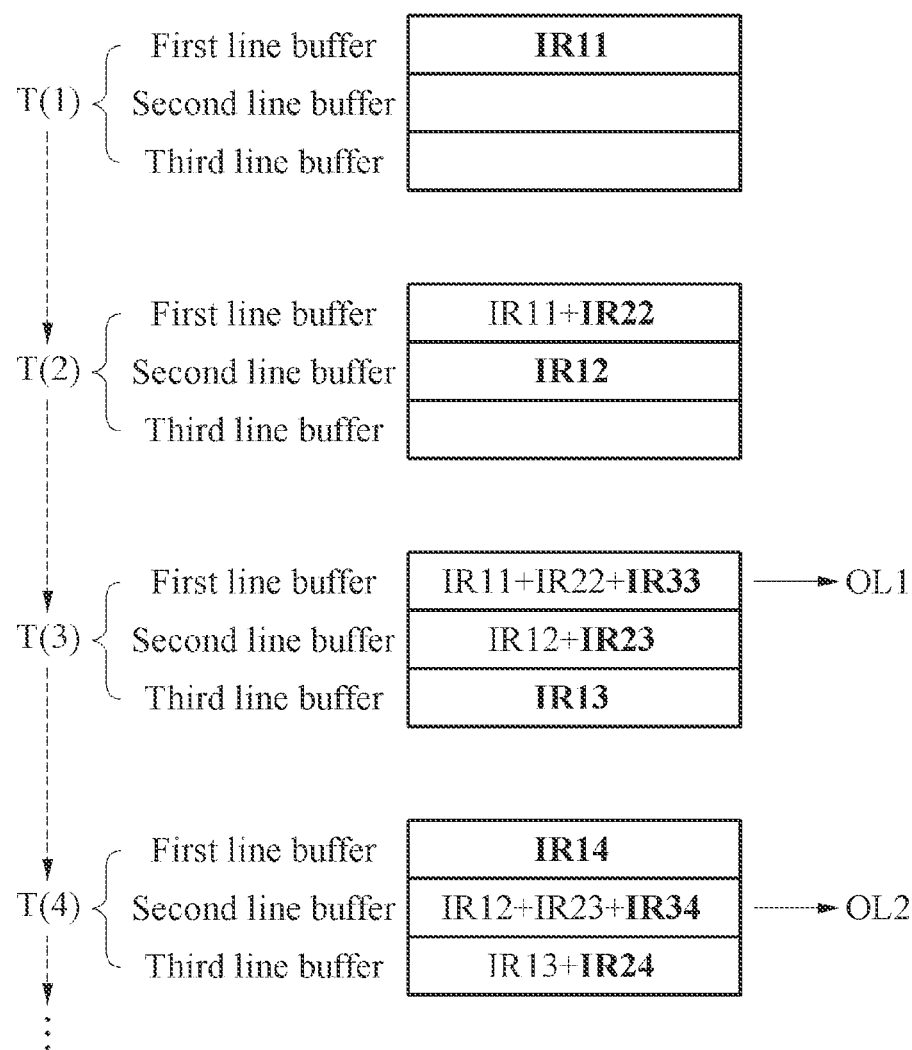

FIGS. 4 to 6 illustrate examples of processes of processing a 2D convolution operation. Referring to FIG. 4, a first-order partial operation and a second-order partial operation are performed to implement an objective operation between a weight kernel 410 and a first area 420 of an input frame, for example, an input feature map. The objective operation may be a 2D (3×3) convolution operation, and the first-order partial operation may be a 1D (1×3) convolution operation in a width direction and the second-order partial operation may be an accumulation operation in a height direction. The first-order partial operation of performing an operation between elements in the width direction may be referred to as a widthwise operation and the second-order partial operation of performing an operation between elements in the height direction may be referred to as a height-wise direction. Also, the width direction may be referred to as a lateral direction and the height direction may be referred to a longitudinal direction. As an objective operation result, an output line OL1 for an output frame, for example, an output feature map, is generated. The generated output line OL1 may correspond to an objective operation result about the first area 420.

The first-order partial operation performs a 1D convolution operation between weight lines WL1, WL2, and WL3 of the weight kernel 410 and input lines IL1, IL2, and IL3 of the first area 420 of the input frame. A weight line WLi includes weight elements $W_{i1}$, $W_{i2}$, and $W_{i3}$ and an input line ILj includes input elements through $I_{jw}$. Here, w denotes a value of 1 to W and a line is also referred to as an element vector.

According to the 1D convolution operation, intermediate operation results IR11, IR22, and IR33 are generated. The intermediate operation result IR11 is generated through the 1D convolution operation between the weight line WL1 and the input line IL1, the intermediate operation result IR22 is generated through the 1D convolution operation between the weight line WL2 and the input line IL2, and the intermediate operation result IR33 is generated through the 1D convolution operation between the weight line WL3 and the input line IL3. The intermediate operation result IRij includes intermediate elements through $I_{ijw}$.

The second-order partial operation generates the output line OL1 by accumulating the intermediate operation results IR11, IR22, and IR33. The accumulation operation is performed elementwise. For example, an output element $O_{11}$ is generated by accumulating intermediate elements $I_{111}$, $I_{221}$, and $I_{331}$. The 1D convolution operation and the accumulation operation are performed for other areas of the input frame and other output lines are generated. An output line OLm includes output elements through $O_{mw}$.

In a 1D convolution operation process between the weight lines WL1, WL2, and WL3 and the input lines IL1, IL2, and IL3, another intermediate operation result may be generated in addition to the intermediate operation results IR11, IR22, and IR33. For example, an intermediate operation result IR12 of FIG. 5 may be generated through a 1D convolution operation between the weight line WL1 and the input line IL2. For simplicity of description, the other intermediate operation result is omitted in FIG. 5. FIG. 5 illustrates an example of a 1D convolution process that includes the other intermediate operation.

Referring to FIG. 5, an input line IL1 for FIG. 5 is received in a time T(1) and a 1D convolution operation associated with the input line IL1 is performed. For example, intermediate operation results IR11, IR21, and IR31 are generated through a 1D convolution operation between weight lines WL1, WL2, and WL3 and the input line IL1. Likewise, an input line IL2 is received in a time T(2) and a 1D convolution operation associated with the input line IL2 is performed. An input line IL3 is received in a time T(3) and a 1D convolution operation associated with the input line IL3 is performed. 1D convolution operations respectively associated with other input lines are sequentially performed after the time T(3).

When intermediate operation results are generated through a 1D convolution operation on each input line and corresponding intermediate operation results are secured, an accumulation operation on the corresponding intermediate operation results is performed. For example, referring to FIG. 4, the output line OL1 is generated by accumulating elementwise the intermediate operation results IR11, IR22, and IR33. Referring to FIG. 5, the intermediate operation result IR11 is generated in the time T(1), the intermediate operation result IR22 is generated in the time T(2), and the intermediate operation result IR33 is generated in the time T(3). Therefore, an output line OL1 is generated based on the intermediate operation results IR11, IR22, and IR33 in the time T(3). For example, when the intermediate operation result IR22 is generated in the time T(2), the intermediate operation result IR11 and the intermediate operation result IR22 may be accumulated to generate accumulation data. When the intermediate operation result IR33 is generated in the time T(3), the accumulation data and the intermediate operation result IR33 may be accumulated to generate the output line OL1.

After the time T(3), other output lines may be sequentially generated. For example, although not illustrated in FIG. 5, an output line OL2 may be generated based on intermediate operation results IR12, IR23, and IR34 in a time T(4) and an output line OL3 may be generated based on intermediate operation results IR13, IR24, and an IR35 in a time T(5).

In one example, a special operation different from an operation pattern of a remaining time (e.g., the time T(3)) may be performed during a desired initial period of time, for example, the time T(1) and the time T(2), such as based on the 3×3 convolution starting with the first input line and an example stride of 1 for the 3×3 convolution. For example, while all of the intermediate operation results generated after the time T(3) may be respectively used to generate corresponding output lines, a portion (e.g., IR21, IR31, and IR32) of the intermediate operation results generated in the time T(1) and T(2) may not be used to generate the corresponding output lines. Therefore, particular 1D convolution operations may be performed using only a portion of the weight lines WL1, WL2, and WL3 during the desired initial period of time, while the 1D convolution operations may be respectively performed on all of the weight lines WL1, WL2, and WL3 during each of the remaining periods of time. Alternatively, a 1D convolution operation may be performed on all of the weight lines WL1, WL2, and WL3 during an entire period of time and a portion unused among the intermediate operation results generated during the initial desired period of time may be discarded, e.g., prior to accumulation.

FIG. 6 illustrates an example of a process of storing each intermediate operation result in a line buffer. As described above, for example, in the case of using line processing, a frame buffer may not be used, but rather, a line buffer may be used. When operation results of line processing are stored in the respective line buffers, output lines may be generated. In this process, each line buffer may be cyclically reused. In FIG. 6, it is assumed in this example that intermediate operation results unused to generate the corresponding output line may not be generated.

Referring to FIG. 6, in a time T(1), an intermediate operation result IR11 is generated and stored in a first line buffer. In a time T(2), intermediate operation results IR12 and IR22 are generated and, among them, the intermediate operation result IR12 is stored in a second line buffer. Since the intermediate operation results IR11 and IR22 are accumulation elements for an output line OL1, the intermediate operation result IR22 is accumulated with the intermediate operation results IR11 and the accumulated results stored in the first line buffer, i.e., the intermediate operation result IR22 is 'accumulatively' stored in the first line buffer.

In a time T(3), intermediate operation results IR13, IR23, and IR33 are generated and, among them, the intermediate operation result IR13 is stored in a third line buffer. Since the intermediate operation results IR12 and IR23 are accumulation elements for an output line OL2, the intermediate operation result IR23 is stored in the second line buffer. Since the intermediate operation results IR11, IR22, and IR33 are accumulation elements for the output line OL1, the intermediate operation result IR33 is accumulatively stored in the first line buffer and the output line OL1 is generated based on a result of the accumulating of the intermediate operation results IR11, IR22, and IR33.

In a time T(4), intermediate operation results IR14, IR24, and IR34 are generated and, among them, the intermediate operation result IR14 is stored in the first line buffer. The existing result of accumulating the intermediate operation results IR11, IR22, and IR33 that had been stored in the first line buffer is no longer used, and thus, the first line buffer is reused to store the intermediate operation result IR14. Since the output line OL1 corresponds to an objective operation result about a first area of the input frame, the first line buffer may be understood as being used to store the intermediate operation result IR14 about another area of the input frame. The intermediate operation result IR24 is accumulatively stored in the third line buffer and the intermediate operation result IR34 is accumulatively stored in the second line buffer. The output line OL2 is thus generated based on a result of the accumulating of the intermediate operation results IR12, IR23, and IR34. By repeating the above process, all of the output lines corresponding to an output frame may be generated.

In one example, when a K1×K2 weight kernel is used, that is, when a weight kernel includes K2 weight lines, K2 line buffers are used for a K1×K2 convolution operation. For example, the K1×K2 convolution operation may be performed by cyclically reusing the K2 line buffers and a memory may be saved due to a buffer reuse. In addition, the number of line buffers may be independent of stride. For example, if the stride of 2 is applied to the examples of FIGS. 4-6, three line buffers may be used. Thus, for example, while the total K2 number of line buffers may be used for different strides, the arrangement of the data in the input line may vary depending on the stride.

Figure 7:
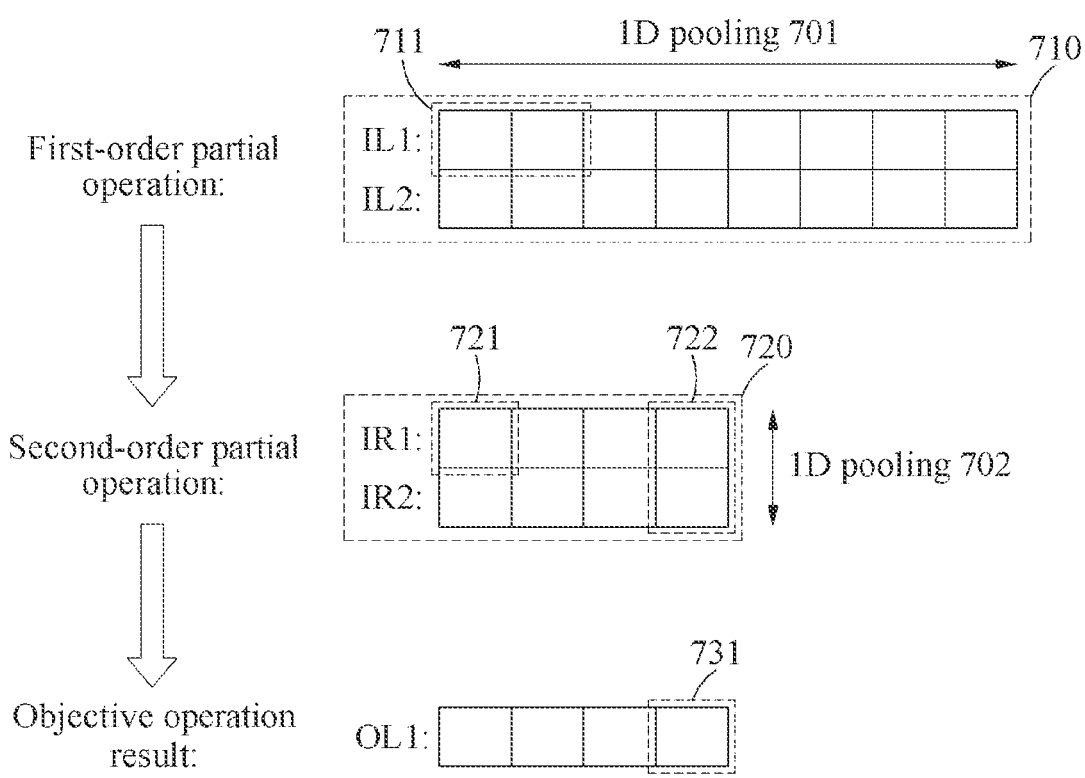
FIGS. 7 to 9 illustrate examples of processes of processing a 2D pooling operation.
Figure 8:
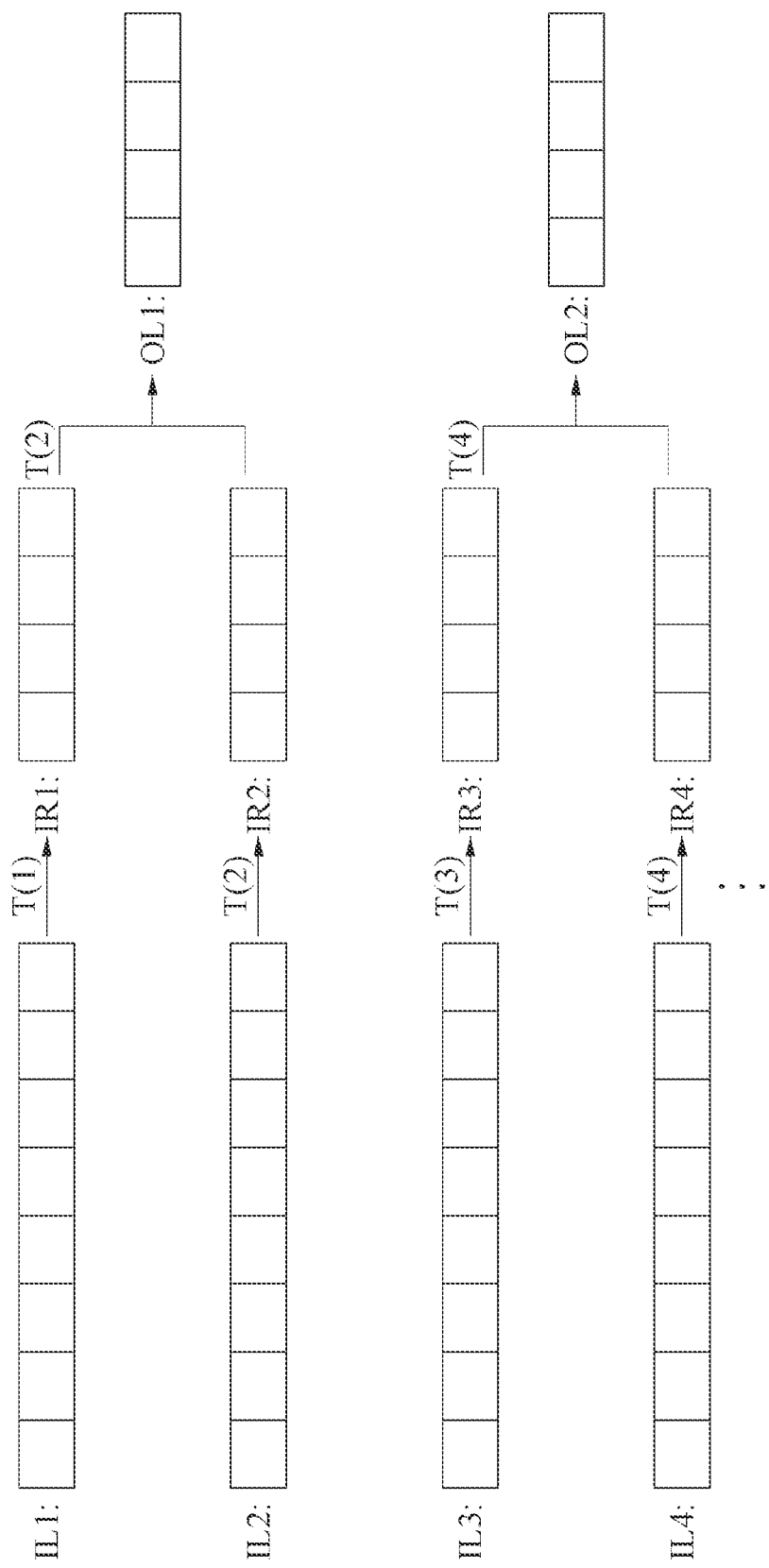
Figure 9:
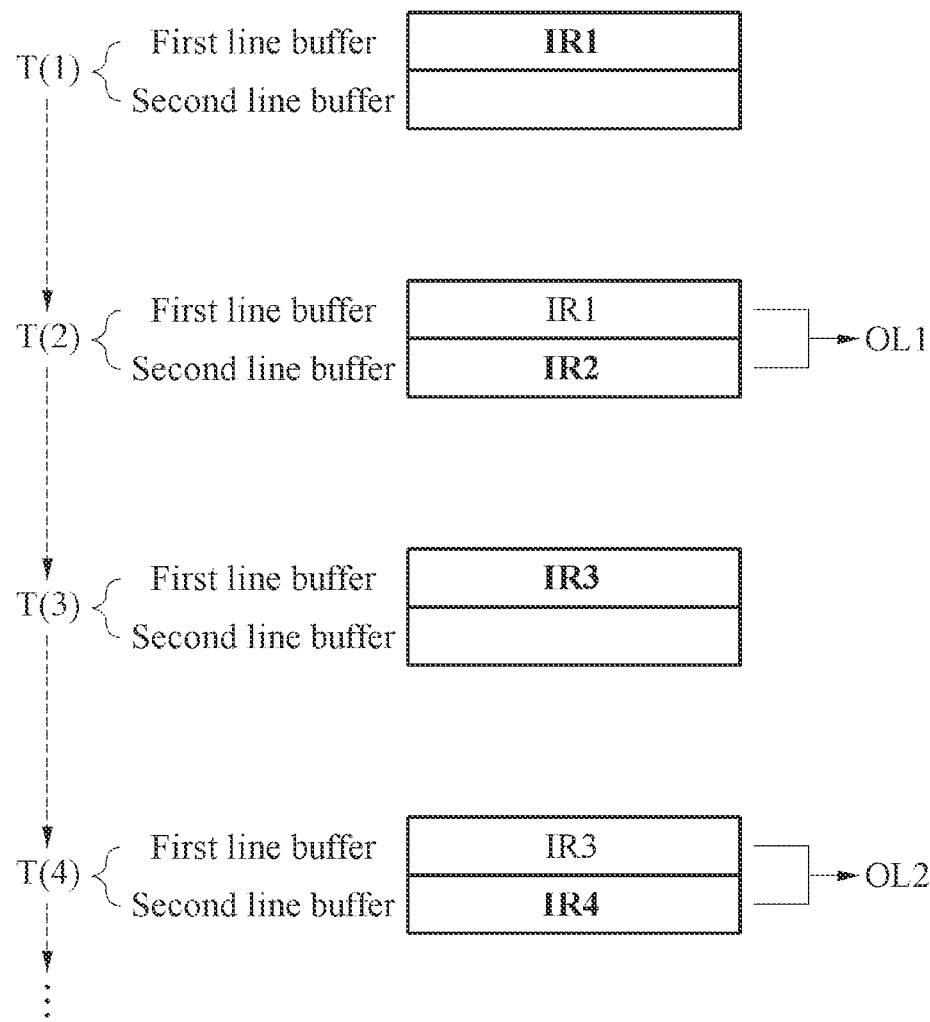

FIGS. 7 to 9 illustrate examples of processes of processing a 2D pooling operation. Referring to FIG. 7, to implement an objective operation for a first area 710 of an input frame, for example, an input feature map, a first-order partial operation and a second-order partial operation are performed. An objective operation is a 2D (2×2) pooling operation, the first-order partial operation is a 1D (1×2) pooling operation 701 in a width direction and the second-order partial operation is a 1D (2×1) pooling operation 702 in a height direction. As an objective operation result about the first area 710, an output line OL1 corresponding to an output frame, for example, an output feature map may be generated.

For the first-order partial operation, the 1D pooling operation 701 is performed on an input line IL1 and an intermediate operation result IR1 is generated. For example, the 1D pooling operation 701 on elements 711 is performed and an element 721 is generated. The 1D pooling operation 701 on an input line IL2 is performed and an intermediate operation result IR2 is generated.

For the second-order partial operation, the 1D pooling operation 702 on intermediate operation results IR1 and IR2 is performed. For example, the 1D pooling operation 702 on elements 722 is performed and an element 731 is generated. According to the 1D pooling operation 702, the output line OL1 is generated. The 1D pooling operation 701 and the 1D pooling operation 702 may be performed for other areas of the input frame and other output lines may be generated.

Referring to FIG. 8, in a time T(1), an intermediate operation result IR1 is generated in such a manner that an input line IL1 is received and a 1D (1×2) pooling operation associated with the input line IL1 is performed. Likewise, in a time T(2), an intermediate operation result IR2 is generated in such a manner that an input line IL2 is received and a 1D (1×2) pooling operation associated with the input line IL2 is performed.

When intermediate operation results are generated according to a 1D (1×2) pooling operation on each of the input lines and corresponding intermediate operation results are secured, the 1D (2×1) pooling operation may be performed on the corresponding intermediate operation results. When the intermediate operation result IR1 is generated in the time T(1), and when the intermediate operation result IR2 is generated in the time T(2), corresponding intermediate operation results are used. Therefore, an output line OL1 is generated in the time T(2) by performing the 1D (2×1) pooling operation on each of the intermediate operation results IR1 and IR2.

The above process may be repeated at another time. For example, in a time T(3), when an input line IL3 is received, a 1D (1×2) pooling operation associated with the input line IL3 is performed and an intermediate operation result IR3 is generated. Also, in a time T(4), when an input line IL4 is received, a 1D (1×2) pooling operation associated with the input line IL4 is performed and an intermediate operation result IR4 is generated. Since corresponding intermediate operation results are secured in the time T(4), an output line OL2 is generated by performing the 1D (2×1) pooling operation based on the intermediate operation result IR3 and the intermediate operation result IR4.

Referring to FIG. 9, in a time T(1), an intermediate operation result IR1 is generated and stored in a first line buffer. In a time T(2), an intermediate operation result IR2 is generated and stored in a second line buffer. Since the intermediate operation results IR1 and IR2 are pooling elements for an output line OL1, the output line OL1 is generated by pooling the intermediate operation results IR1 and IR2.

Likewise, an intermediate operation result IR3 is generated and stored in the first line buffer in a time T(3), and an intermediate operation result IR4 is generated and stored in the second line buffer in a time T(4). For example, since the intermediate operation result IR1 stored in the first line buffer and the intermediate operation result IR2 stored in the second line buffer are no longer used, each of the first line buffer and the second line buffer may be reused to store another intermediate operation. Thus, since the output line OL1 corresponds to an objective operation result about a first area of an input frame and an output line OL2 corresponds to an objective operation result about a second area of the input frame, the first line buffer and the second line buffer may be understood as being used to store the intermediate operation results IR3 and IR4 about other areas of the input frame.

In the time T(4), the output line OL2 is generated by pooling the intermediate operation results IR3 and IR4. By repeating the above process, all of the output lines of an output frame are generated. In one example, when an L1×L2 pooling operation is performed, L1 line buffers may be used. For example, the L1×L2 pooling operation may be performed by cyclically reusing L1 line buffers and an overall memory use and size may be reduced due to such buffer reuse compared to performance of pooling based on a frame unit. Description made above with reference to FIGS. 4 to 6 may apply to examples of FIGS. 7 to 9.

Figure 10A:
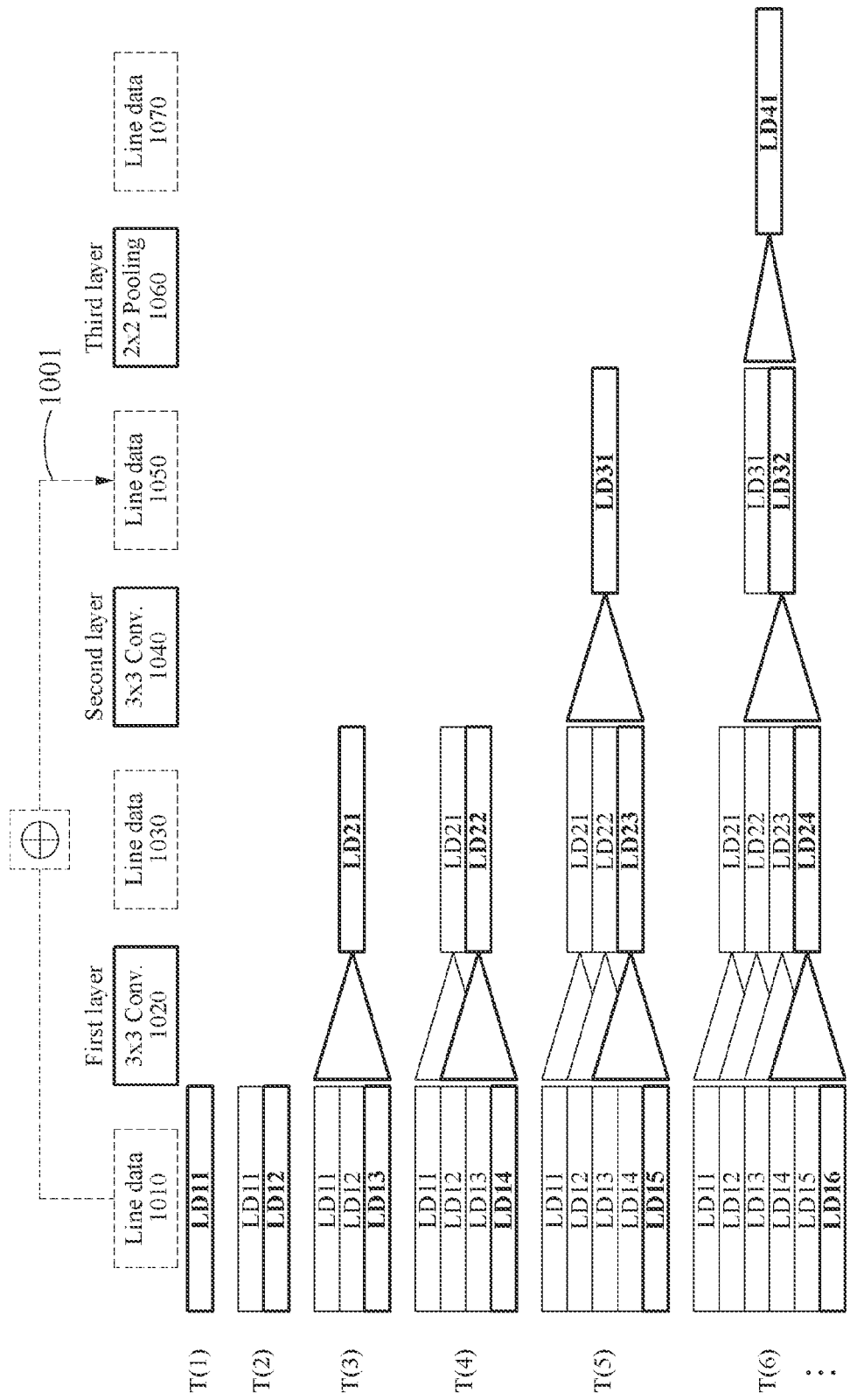
FIGS. 10A, 10B, and 11 illustrate examples of processes of consecutively processing line data through a plurality of layers.
Figure 10B:
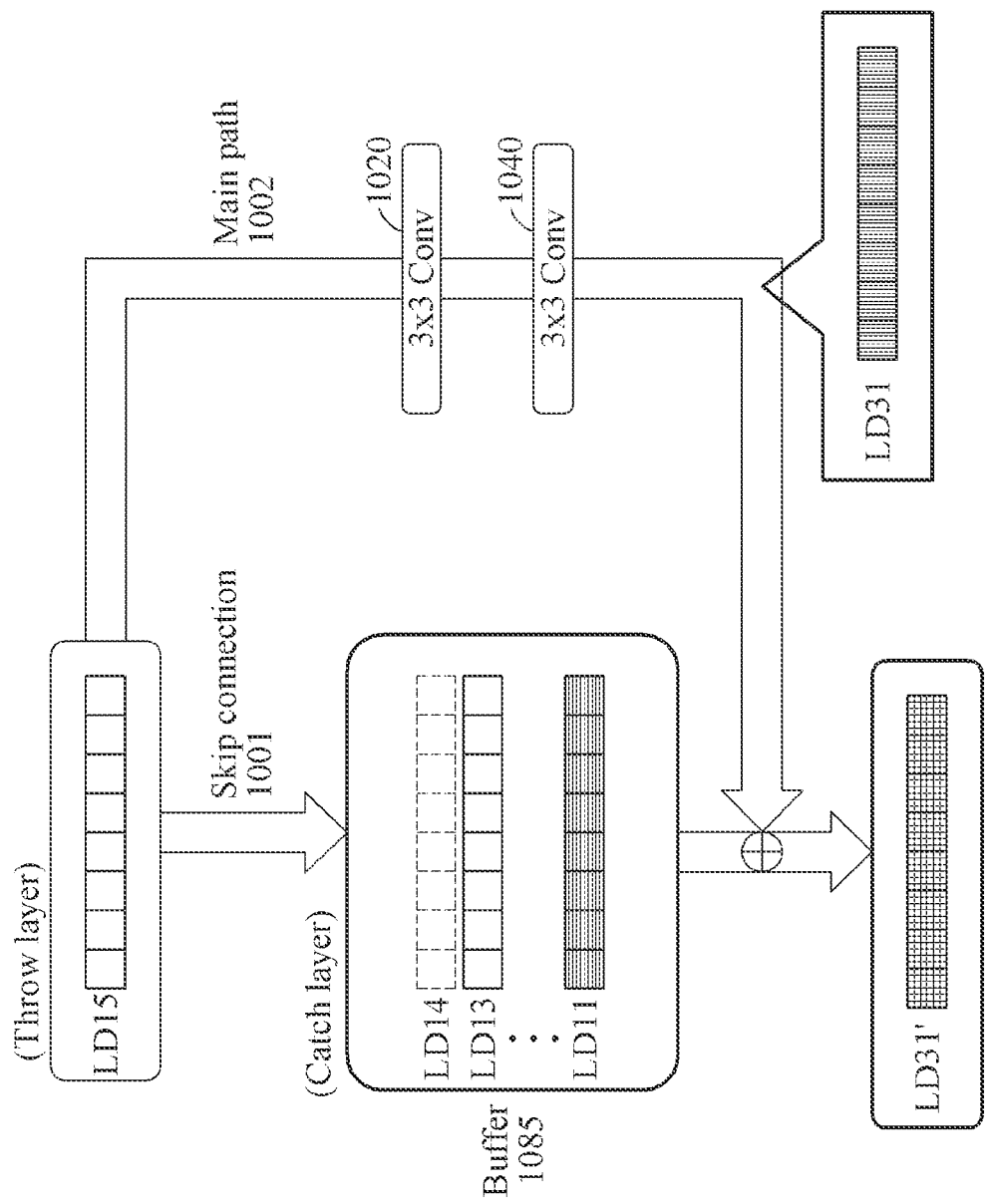
Figure 11:
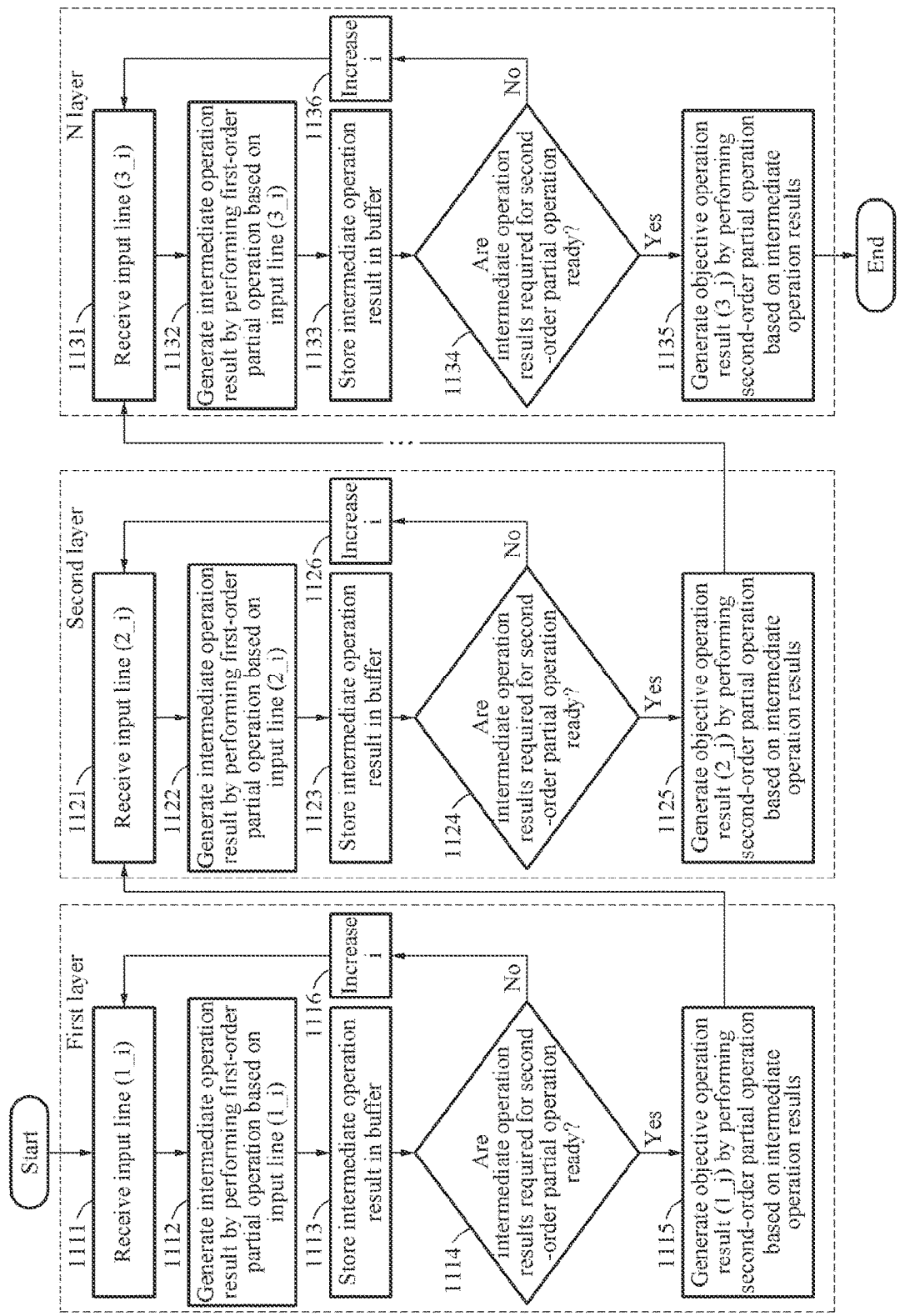

FIGS. 10A, 10B, and 11 illustrate examples of processes of consecutively and concurrently processing line data through a plurality of layers, e.g., a plurality of layers of a neural network. Referring to FIG. 10A, line data 1030 is generated by performing a 3×3 convolution operation 1020 on line data 1010, line data 1050 is generated by performing a 3×3 convolution operation 1040 on the line data 1030, and line data 1070 is generated by performing a 2×2 pooling operation 1060 on the line data 1050.

The processing process of FIG. 10A is performed through two convolutional layers in which the 3×3 convolution operations 1020 and 1040 are performed and a single pooling layer in which the 2×2 pooling operation 1060 is performed. The above three layers may be referred to as a first layer, a second layer, and a third layer, respectively, of the plurality of layers. The line data 1030 may be understood as output line data of a first convolutional layer in which the 3×3 convolution operation 1020 is performed and input line data of a second convolutional layer in which the 3×3 convolution operation 1040 is performed.

With respect to the first layer, line processing associated with line data LD11, LD12, and LD13 is performed during a period of time T(1) to T(3) to generate line data LD21. A line processing operation may be performed on the first layer during a time T(1) to T(3). During a period of time T(4) to T(6), line processing similar to the time T(3) is performed on line data LD14, LD15, and LD16. In this process, line data LD22, LD23, and LD24 is generated.

With respect to the second layer, line processing is performed on the line data LD21, LD22, and LD23 during a period of time T(3) to T(5) to generate line data LD31. Likewise, line data LD32 is generated based on line processing associated with the line data LD24 in the time T(6). A line processing operation similar to the first layer may be performed on the second layer. With respect to a third layer, line processing is performed on the line data LD31 and LD32 to generate line data LD41 during a period of time T(5) and time T(6). A line processing operation described with reference to FIGS. 7 to 9 may be performed on the third layer during the period of time T(5) and the time T(6) for the 2×2 pooling.

In the case of a typical neural network implementation, an operation on a subsequent layer may only be performed after an operation on a previous layer is completed to generate the input to the subsequent layer. Rather, when line processing according to an example is performed, an operation on a subsequent layer may be performed even though all operations of a previous layer are not yet completed. Referring to FIG. 10A, even though all operations of the first layer are not completed in the time T(5), an operation of the second layer may still be performed on results of those operations that have been completed by the first layer. Through this, parallel processing may be applied for the operations of multiple layers of the neural network and a computation time may decrease through parallel processing. In addition, while FIG. 10A illustrates line processing of plural layers in parallel with the proposed line processing, line processing may additionally be performed on a plurality of kernels of a layer, in parallel.

Also, when line processing on the line data LD11 is completed in the time T(1), the line data LD11 may not be used thereafter. Therefore, a memory space in which the line data LD11 has been stored may alternatively now be used for another purpose from the time T(2). For example, the memory space in which the line data LD11 was stored may now be used to store an intermediate operation result or an objective operation result, which may lead to a reduction in used memory space compared to previous approaches based on frame units.

In one example, a network may include a skip connection. The skip connection refers to a kind of network operation that uses an addition of an input and an output of a network as an input of a subsequent layer of the corresponding network. For example, while an output of a current layer may be used in an immediately subsequent layer, an input to or output from a previous layer may also be used in the immediately subsequent layer Here, a concatenation operation may also be performed instead of an addition operation. When the skip connection is present in a network that includes a first layer and a second layer, an addition of an input (an input to the first layer) of the corresponding network and an output (an output of the second layer) of the network may be input to a third layer. The first layer and the second layer may be discontinuous and the third layer may be a subsequent layer of the second layer. Also, the first layer may be referred to as a throw layer and the second layer may be referred to as a catch layer. When the skip connection is present, the line data LD11 is maintained in the memory for a longer time.

Referring to FIG. 10A, an addition operation is shown as additionally being performed between the line data 1010 and the line data 1050 through the example skip connection 1001. Accordingly, line data LD11 is stored in an additional buffer associated with a catch layer of the skip connection 1001 and is maintained to be stored until an operation, for example, the addition operation or a concatenation operation, on the skip connection 1001 is completed. For example, the line data LD11 may be maintained through the time T(5) in or after which an operation between the line data LD11 and the line data LD31 is performed through the skip connection 1001. An example operation result is illustrated as line data LD31'. Likewise, the line data LD12 may be maintained through the time T(6). In this case, an additional buffer may be used due to time the line data LD 12 and line data LD11 are maintained. For example, since a duration of time from the time T(1) to the time T(5) is used to maintain the line data LD11 through the skip connection 1001, four additional buffers may be used. Even in such a case where extra buffers are used, the memory space in which the example line data LD11 is stored may be reused for another purpose after the time T(6) and thus, the memory space may be saved. The skip connection 1001 is further described with reference to FIG. 10B.

Referring to FIG. 10B, an input line of a throw layer is transferred to a catch layer through the skip connection 1001 and the input line is stored in a buffer 1085 to compensate for a latency between the skip connection 1001 and a main path 1002. The throw layer and the catch layer may correspond to the first layer and the second layer of FIG. 10A, respectively.

FIG. 10B illustrates an example of a situation of the time T(5) of FIG. 10A. For example, in the time T(5), line data LD15 is input to the first layer and the line data LD31 is output from the second layer. Here, line data LD14 to line data LD11 are stored in the buffer 1085. The data is stored during a period of time including time T(1) to time T(4). The line data LD31 is added to the line data LD11 of the buffer 1085 along the skip connection 1001 to generate the line data LD31'. When the line data LD31' is generated, the line data LD11 may be deleted from the buffer 1085 and the line data LD15 may be stored in the buffer 1085. As described above, j=4 additional buffers may be used for the skip connection 1001. Here, j may correspond to the delay by the skip connection 1001. In FIGS. 10A and 10B, since a time used to maintain the line data LD11 is delayed from the time T(1) to the time T(5) by the skip connection 1001, j=4.

FIG. 11 illustrates an example of line processing for respective layers. Referring to FIG. 11, operations 1111 to 1115 relate to line processing of a first layer, operations 1121 to 1125 relate to line processing of a second layer, and operations 1131 to 1135 relate to line processing of an $N^{th}$ layer. The first layer, the second layer, and the $N^{th}$ layer of FIG. 11 may correspond to the first layer, the second layer, and the third layer of FIG. 10A, respectively.

In operation 1111, a processing apparatus receives an input line (1_i). In operation 1112, the processing apparatus generates an intermediate operation result by performing a first-order partial operation based on the input line (1_i). In operation 1113, the processing apparatus stores the intermediate operation result in a buffer. With the example assumption that the first layer of FIG. 11 corresponds to the first layer of FIG. 10A, the first-order partial operation may be a 1D convolution operation for the example 3×3 convolution operation 1020 of FIG. 10A.

In operation 1114, the processing apparatus determines whether intermediate operation results used for a second-order partial operation are ready. For example, the intermediate operation results used for the second-order partial operation may be the intermediate operation results IR11, IR22, and IR33 of FIG. 4. When the intermediate operation results are not ready, the processing apparatus increases a corresponding line value of i in operation 1116 and again performs operation 1111. When the intermediate operation results are ready, the processing apparatus generates an objective operation result (1_j) by performing the second-order partial operation based on the intermediate operation results in operation 1115. With an example assumption that the first layer of FIG. 11 corresponds to the first layer of FIG. 10A, the second-order partial operation may be an accumulation operation for the 3×3 convolution operation 1020 of FIG. 10A.

The processing apparatus receives an input line (2_i) in operation 1121, generates an intermediate operation result by performing a first-order partial operation based on the input line (2_i) in operation 1122, and stores the intermediate operation result in a buffer in operation 1123. With an example assumption that the second layer of FIG. 11 corresponds to the second layer of FIG. 10A, the first-order partial operation may be a 1D convolution operation for the 3×3 convolution operation 1040 of FIG. 10A and the input line (2_i) may correspond to the objective operation result (1_j).

In operation 1124, the processing apparatus determines whether intermediate operation results used for the second-order partial operation are ready. When the intermediate operation results are not ready, the processing apparatus increases a corresponding line value of i in operation 1126 and again perform operation 1121. When the intermediate operation results are ready, the processing apparatus generates an objective operation result (2_j) by performing the second-order partial operation based on the intermediate operation results in operation 1125. With an example assumption that the second layer of FIG. 11 corresponds to the second layer of FIG. 10A, the second-order partial operation may be an accumulation operation for the 3×3 convolution operation 1040 of FIG. 10A.

The processing apparatus receives an input line (3_i) in operation 1131, generates an intermediate operation result by performing a first-order partial operation based on the input line (3_i) in operation 1132, and stores the intermediate operation result in a buffer in operation 1133. With an example assumption that the $N^{th}$ layer of FIG. 11 corresponds to the third layer of FIG. 10A, the first-order partial operation may be a 1D pooling operation in a width direction for the 2×2 pooling operation 1060 of FIG. 10A and the input line (3_i) may correspond to the objective operation result (2_j).

In operation 1134, the processing apparatus determines whether intermediate operation results used for the second-order partial operation are ready. When the intermediate operation results are not ready, the processing apparatus increases a corresponding line value of i in operation 1136 and performs operation 1131 again. When the intermediate operation results are ready, the processing apparatus generates an objective operation result (3_j) by performing the second-order partial operation based on the intermediate operation results in operation 1135. With an example assumption that the $N^{th}$ layer of FIG. 11 corresponds to the third layer of FIG. 10A, the second-order partial operation may be a 1D pooling operation in a height direction for the 2×2 pooling operation 1060 of FIG. 10A.

An operation of an example neural network may be performed by repeating line processing of each layer up to the $N^{th}$ layer. For example, an output of the neural network, such as an object classification result, an object detection result, an object tracking result, an object identification result, an object recognition result, and a user authentication result, may be generated based on the objective operation result (3_j).

Figure 12:
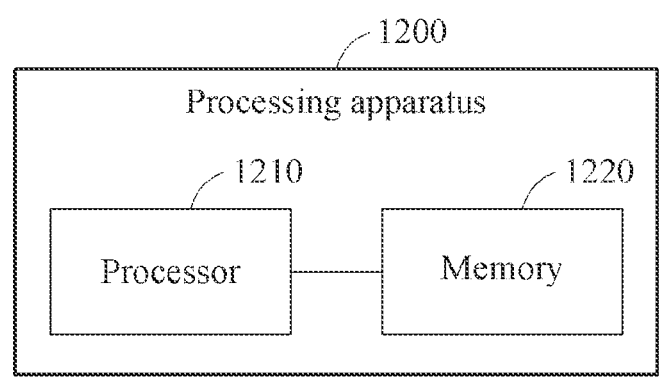
FIG. 12 illustrates an example of a configuration of a processing apparatus.

FIG. 12 illustrates an example of a configuration of a processing apparatus. Referring to FIG. 12, a processing apparatus 1200 includes a processor 1210 and a memory 1220, as a non-limiting example. The memory 1220 is connected to the processor 1210 and stores instructions executable by the processor 1210, data to be operated by the processor 1210, or data processed by the processor 1210. The memory 1220 may include non-transitory computer-readable media, for example, high-speed random access memory and/or non-volatile computer-readable storage media, such as, for example, at least one disk storage device, flash memory device, or other non-volatile solid state memory device, and the memory 1220 is also representative of the above described buffers.

The processor 1210 executes instructions to execute an operation of the neural network provided through FIGS. 1 to 11, FIG. 13, and FIG. 14. For example, the processor 1210 may generate a first intermediate operation result by performing a first-order partial operation based on a first input line of a first area of an input frame, generate a second intermediate operation result by performing the first-order partial operation based on a second input line of the first area, and generate an objective operation result about the first area by performing a second-order partial operation based on the first intermediate operation result and the second intermediate operation result. The processor 1210 is also representative of multiple processors and/or multiple cores configured for performing parallel operations of different layers as described above. In addition, the technical description made above with reference to FIGS. 1 to 11, FIG. 13, and FIG. 14 is also applicable to, and represented by, the processing apparatus 1200. The processing apparatus may also be a sensor, e.g., a camera that captures image data.

Figure 13:
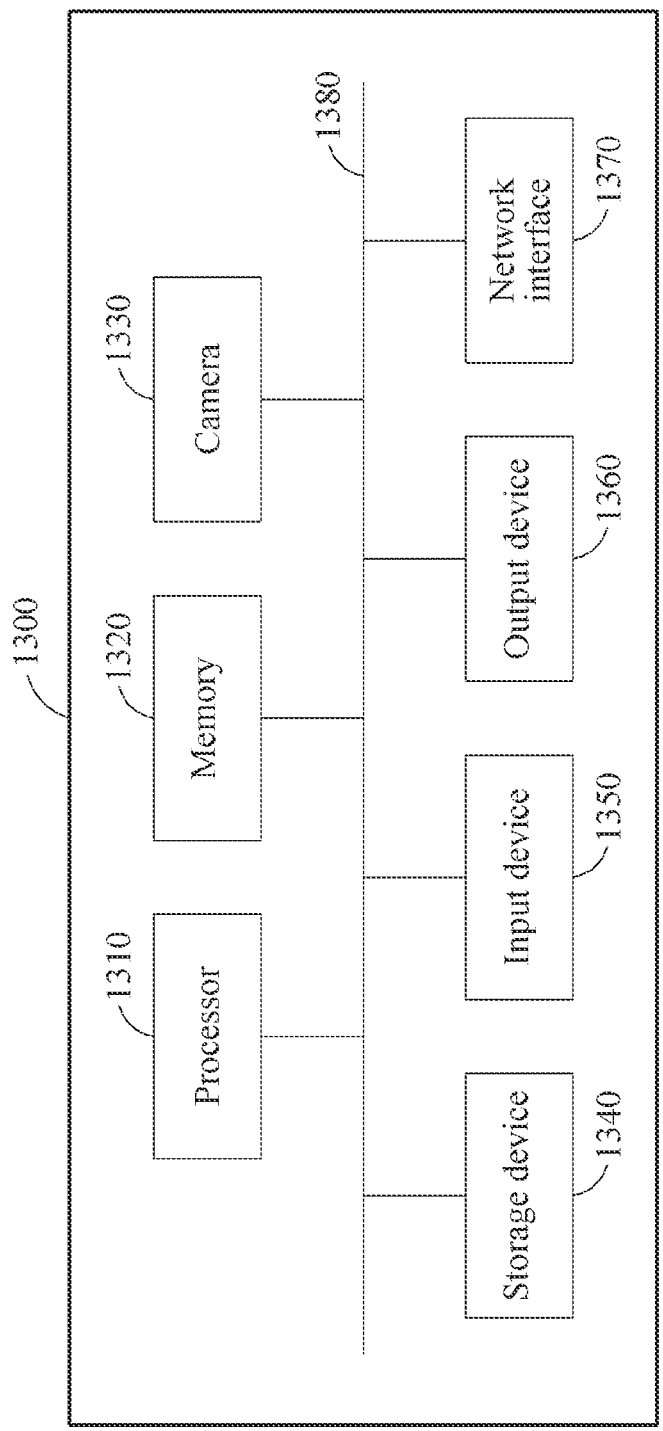
FIG. 13 illustrates an example of an electronic device.

FIG. 13 illustrates an example of a configuration of an electronic device. Referring to FIG. 13, an electronic device 1300 acquires an input image and implements an object classification, an object detection, an object tracking, an object identification, an object recognition, and/or a user authentication based on one or more input images or other input or sensed information using a neural network. The processor 1310 is also representative of the processing apparatuses described herein. Additionally, as a sensor, the camera 1330 is also representative of processing elements and memory buffers configured as described herein.

The electronic device 1300 includes the processor 1310, a memory 1320, the camera 1330, a storage device 1340, an input device 1350, an output device 1360, and a network interface 1370. The processor 1310, the memory 1320, the camera 1330, the storage device 1340, the input device 1350, the output device 1360, and the network interface 1370 communicate with each other through a communication bus 1380. For example, the electronic device 1300 may be a mobile device such as a mobile phone, a smartphone, a personal digital assistant (PDA), a netbook, a tablet computer, and a laptop computer; a wearable device such as a smart watch, a smart band, and smart glasses; a computing apparatus, such as a desktop computer and a server; home appliances, such as a television (TV), a smart TV, and a refrigerator; a security device such as a door lock; and a part of a vehicle, such as a smart vehicle.

The processor 1310 executes instructions for execution in the electronic device 1300. For example, the processor 1310 processes instructions stored in the memory 1320 or the storage device 1340. As noted above, the processor 1310 may perform any or any combination of the operations of neural networks described through FIGS. 1 to 12 and FIG. 14.

The memory 1320 stores data related to processing of the neural network, such as the parameters of the neural network, e.g., including trained weights and/or kernels. The memory 1320 may include computer-readable storage media or computer-readable storage device. The memory 1320 stores instructions to be executed by the processor 1310 and stores related information during execution of software and/or an application by the electronic device 1300.

The camera 1330 captures a photo and/or a video. For example, the camera 1330 may capture a facial image that includes a body and/or a face of a user. The camera 1330 may be a 3D camera that provides a 3D image including depth information of objects. The camera 1330 may capture image information or data as described above with respect to FIGS. 1-12 and below with respect to FIG. 14, e.g., as input to any of the neural network operations.

The storage device 1340 includes computer-readable storage media or computer-readable storage device. The storage device 1340 stores a larger amount of information than the memory 1320 and stores the information for a long period of time. For example, the storage device 1340 may include a magnetic hard disk, an optical disc, a flash memory, a floppy disk, or other types of non-volatile memory known in the art.

The input device 1350 receives an input from the user using a keyboard and a mouse, as well as through, a touch input, a voice input, and an image input, for example. For example, the input device 1350 may include another device configured to detect an input from a keyboard, a mouse, a touchscreen, a microphone, or the user, and to transfer the detected input to the electronic device 1300.

The output device 1360 provides an output of the electronic device 1300 to the user through a visual, an auditory, or a tactile channel. The output device 1360 may include, for example, a display, a touchscreen, a speaker, a vibration generator, or another device capable of providing an output to the user. The network interface 1370 communicates with an external device through a wired or wireless network.

Figure 14:
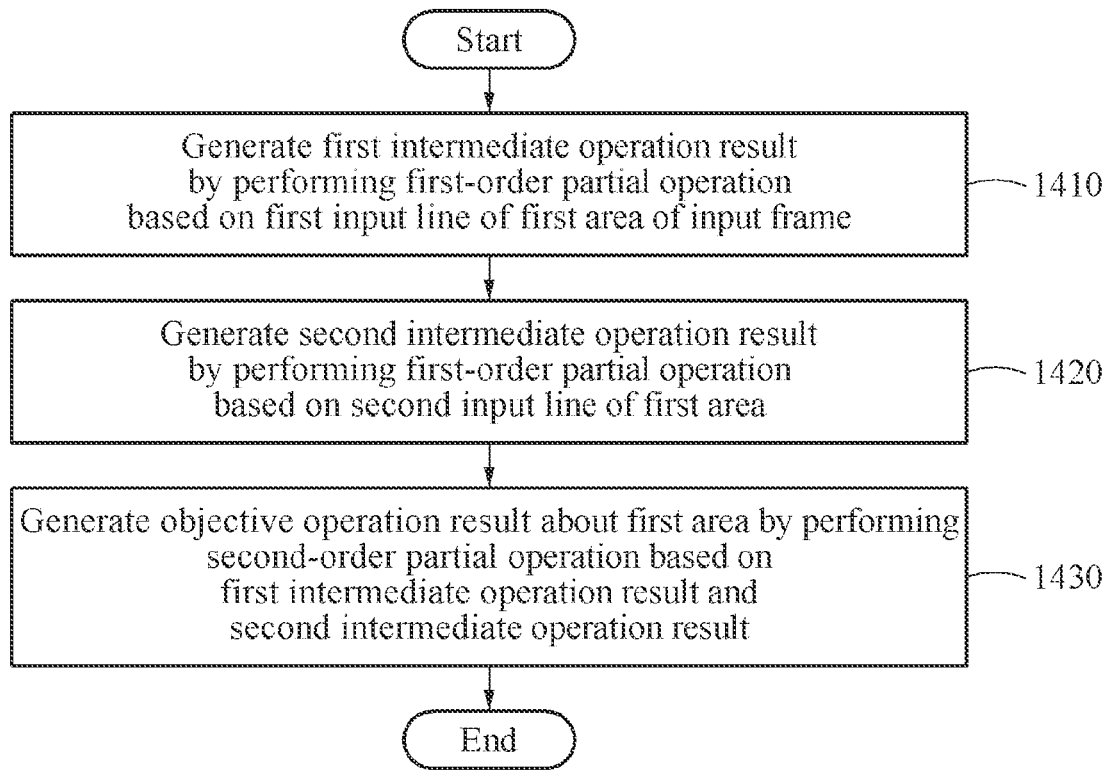
FIG. 14 illustrates an example operation of an electronic device.

FIG. 14 illustrates non-limiting example of an operation processing process of a layer in a neural network. Referring to FIG. 14, the processing apparatus generates a first intermediate operation result by performing a first-order partial operation based on a first input line of a first area of an input frame in operation 1410, generates a second intermediate operation result by performing a first-order partial operation based on a second input line of the first area in operation 1420, and generates an objective operation result about the first area by performing a second-order partial operation based on the first intermediate operation result and the second intermediate operation result in operation 1430. In addition, the technical description made above with reference to FIGS. 1 to 13 also apply to the operation processing process of FIG. 14, and are not repeated for brevity purposes.

The processing apparatuses, processors, processing elements, buffers, memories, sensors, cameras, storage devices, input devices, output devices, network interfaces, buses, and other apparatuses, modules, devices, and other components described herein with respect to FIGS. 1-14 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
generating a first intermediate operation result by performing a first-order partial operation of a neural network layer on a first input line of a first area of a channel of a frame, and storing the first intermediate operation result in a buffer;
generating a second intermediate operation result by performing another first-order partial operation of the neural network layer on a second input line of the first area;
generating an objective operation result of the neural network layer with respect to the first area based on a second-order partial operation performed on the first intermediate operation result and the second intermediate operation result;
reusing the buffer to store an intermediate operation result with respect to another area of the frame after the objective operation result is generated; and
completing, before all pixel values of the frame are received, respective objective operation results of plural subsequent neural network layers dependent on the generated objective operation result of the neural network layer with respect to the first are a,
wherein the neural network layer and the plural subsequent neural network layers are layers of a same neural network.

2. The method of claim 1, wherein each of the first-order partial operation on the first input line and the other first-order partial operation on the second input line correspond to operations in a first direction of the first area, and
the second-order partial operation performed on the first intermediate operation result and the second intermediate operation result corresponds to an operation in a second direction of the first area different from the first direction.

3. The method of claim 2, wherein the first-order partial operation on the first input line corresponds to a one-dimensional (1D) convolution operation using weights, in the first direction, of a channel of a kernel of the neural network layer, and
the other first-order partial operation on the second input line corresponds to another one-dimensional (1D) convolution operation using different weights, in the first direction, in the channel of the kernel.

4. The method of claim 1, wherein each of the first-order partial operation on the first input line and the other first-order partial operation on the second input line correspond to one-dimensional (1D) convolution operations, and
the second-order partial operation corresponds to an accumulation operation with respect to the first intermediate operation result and the second intermediate operation result.

5. The method of claim 1, wherein each of the first-order partial operation on the first input line and the other first-order partial operation on the second input line correspond to 1D pooling operations in a first direction of the first area, and
the second-order partial operation corresponds to a 1D pooling operation in a second direction different from the first direction.

6. The method of claim 1,
wherein the buffer is a first line buffer, and
wherein the generating of the objective operation result comprises accumulating the stored first intermediate operation result and the generated second intermediate operation result and storing a result of the accumulating in the first line buffer.

7. The method of claim 1, wherein a total, corresponding to a total size of a dimension of an objective operation of the neural network layer, number of line buffers are allocated to store respective intermediate operation results of the neural network layer.

8. The method of claim 7, wherein the total size of the dimension of the objective operation is a total size of a dimension of a two-dimensional (2D) weight kernel channel of the neural network layer.

9. A processor-implemented method, the method comprising:
generating a first intermediate operation result by performing a first-order partial operation of a neural network layer on a first input line of a first area of a channel of a frame;
generating a second intermediate operation result by performing another first-order partial operation of the neural network layer on a second input line of the first area;
generating an objective operation result of the neural network layer with respect to the first area based on a second-order partial operation performed on the first intermediate operation result and the second intermediate operation result; and
completing, before all pixel values of the frame are received, respective objective operation results of plural subsequent neural network layers dependent on the generated objective operation result of the neural network layer with respect to the first are a,
wherein the neural network layer and the plural subsequent neural network layers are layers of a same neural network, and
wherein the neural network layer includes a skip connection, and the first input line is stored in a buffer associated with a catch layer of the skip connection and a storage state of the first input line is maintained until an operation on the skip connection is completed.

10. The method of claim 1, wherein each of the generating of the first intermediate operation result and the generating of the second intermediate operation result are performed before all of the pixel values of the frame are received.

11. The method of claim 1, wherein the generating of the first intermediate operation result is performed between a first point in time at which all of pixel values of the first input line of the frame are received and a second point in time at which at least a portion of other input lines of the frame are received.

12. The method of claim 1, wherein the generating of the objective operation result comprises:
generating a third intermediate operation result by performing the second-order partial operation on the first intermediate operation result and the second intermediate operation result;
generating a fourth intermediate operation result by performing another second-order partial operation on other intermediate operation results generated through additional first-order partial operations on other input lines distinguished from the first input line and the second input line; and
generating the objective operation result by performing a third-order partial operation on the third intermediate operation result and the fourth intermediate operation result.

13. The method of claim 12, wherein the generated objective operation result is a result of a three-dimensional convolution operation.

14. The method of claim 12, wherein each of the first-order partial operation on the first input line and the other first-order partial operation on the second input line correspond to operations in a first direction of the first area,
each of the second-order partial operation on the first intermediate operation result and the second intermediate operation result, and the other second-order partial operation on the other intermediate operation results correspond to operations in a second direction of the first area different from the first direction, and
the third-order partial operation on the third intermediate operation result and the fourth intermediate operation result correspond to operations in a third direction of the first area, with the first area being a volume.

15. The method of claim 1, further comprising capturing an image and storing image information for the captured image as the frame.

16. A non-transitory computer-readable storage medium storing instructions that, when executed by a processor, cause the processor to perform the method of claim 1.

17. A processing apparatus comprising:
a processor; and
a memory storing instructions, wherein execution of the instructions by the processor configures the processor to:
generate a first intermediate operation result by performing a first-order partial operation of a neural network layer on a first input line of a first area of a channel of a frame, and store the first intermediate operation result in a buffer comprised in the processing apparatus;
generate a second intermediate operation result by performing another first-order partial operation of the neural network layer on a second input line of the first area; and
generate an objective operation result of the neural network layer with respect to the first area based on a second-order partial operation performed on the first intermediate operation result and the second intermediate operation result;
reuse the buffer to store an intermediate operation result with respect to another area of the frame after the objective operation result is generated; and
complete, before all pixel values of the frame are received, respective objective operation results of plural subsequent neural network layers dependent on the generated objective operation result of the neural network layer with respect to the first area,
wherein the neural network layer and the plural subsequent neural network layers are layers of a same neural network.

18. The apparatus of claim 17, wherein each of the first-order partial operation on the first input line and the other first-order partial operation on the second input line correspond to operations in a first direction of the first area, and
the second-order partial operation on the first intermediate operation result and the second intermediate operation result corresponds to an operation in a second direction of the first area different from the first direction.

19. A processing apparatus comprising:
a processor; and
a memory storing instructions, wherein execution of the instructions by the processor configures the processor to:
generate a first intermediate operation result by performing a first-order partial operation of a neural network layer on a first input line of a first area of a frame;
generate a second intermediate operation result by performing another first-order partial operation of the neural network layer on a second input line of the first area; and
generate an objective operation result of the neural network layer with respect to the first area based on a second-order partial operation performed on the first intermediate operation result and the second intermediate operation result,
wherein the processor is configured to generate the first intermediate operation result by performing a one-dimensional (1D) pooling operation in a first direction on the first input line of the first area, and to generate the second intermediate operation result by performing another 1D pooling operation in the first direction on the second input line of the first area before an incremental receipt of image information of another frame to a previous neural network layer is concluded.

20. The apparatus of claim 19, wherein the processor is configured to generate the objective operation result by performing a 1D pooling operation, in a second direction different from the first direction, on the first intermediate operation result and the second intermediate operation result.

21. The apparatus of claim 17, wherein the processor is configured to generate each of the first intermediate operation result and the second intermediate operation result before all of pixel values of the frame are received.

22. The apparatus of claim 21, further comprising:
a camera configured to capture an image and generate the frame as image values for the captured image.

23. The apparatus of claim 17, wherein the apparatus is a sensor.

24. An electronic device comprising:
a camera configured to generate an image frame; and
a processor configured to:
generate a first intermediate operation result by performing a first-order partial operation of a neural network layer on a first input line of a first area of a channel of a frame that is dependent on the image frame, and store the first intermediate operation result in a buffer comprised in the electronic device;

generate a second intermediate operation result by performing another first-order partial operation of the neural network layer on a second input line of the first area;

generate an objective operation result of the neural network layer with respect to the first area based on a second-order partial operation performed on the first intermediate operation result and the second intermediate operation result;

reuse the buffer to store an intermediate operation result with respect to another area of the frame after the objective operation result is generated; and complete, before all pixel values of the frame are received, respective objective operation results of plural subsequent neural network layers dependent on the generated objective operation result of the neural network layer with respect to the first area, wherein the neural network layer and the plural subsequent neural network layers are layers of a same neural network.

25. The electronic device of claim 24, wherein the processor is configured to generate the first intermediate operation result by performing a one dimensional (1D) convolution operation between the first input line of the first area and a first weight line of a weight kernel, and to generate the second intermediate operation result by performing a 1D convolution operation between the second input line of the first area and a second weight line of the weight kernel.

26. The electronic device of claim 25, wherein the processor is configured to generate the objective operation result by performing an accumulation operation on the first intermediate operation result and the second intermediate operation result.

27. The electronic device of claim 24, wherein the processor is configured to generate the first intermediate operation result by performing a 1D pooling operation in a first direction on the first input line of the first area, and to generate the second intermediate operation result by performing the 1D pooling operation in the first direction on the second input line of the first area.

28. The electronic device of claim 27, wherein the processor is configured to generate the objective operation result by performing a 1D pooling operation, in a second direction different from the first direction, on the first intermediate operation result and the second intermediate operation result.

29. A processing apparatus comprising:
a processor configured to:
control an incremental receipt of image information of a frame in input line units;

generate a plurality of output lines of a neural network layer of a neural network by, for each of the plurality of output lines of the neural network layer, accumulating results of one-dimensional (1D) convolution operations on each of same channel respective plural line units of image information of the incrementally received image information of the frame;

generate another output line of the neural network layer by accumulating results of one-dimensional (1D) convolution operations on each of another plural line units of additional image information of the incrementally received image information of the frame; and generate a plurality of output lines of a subsequent neural network layer of the neural network by, for each of the plurality of output lines of the subsequent neural network layer, accumulating results of 1D convolution or pooling operations on each of respective multiple output lines of the plurality of output lines of the neural network layer, wherein generation of the plurality of output lines of the subsequent neural network layer are performed before all image information of the frame are incrementally received in the incremental receipt of the image information of the frame in the input line units, and wherein the generation of the other output line occurs after initiation of the generation of the plurality of output lines of the subsequent neural network layer.

30. The apparatus of claim 29, wherein incremental receipt of the image information of the frame includes overwriting a line buffer, storing image information received in the incremental receipt of the image information of the frame, with other image information subsequently received in the incremental receipt of the image information of the frame, before all of the image information of the frame are incrementally received.

* * * * *